(12) United States Patent
Okamoto

(10) Patent No.: US 11,687,839 B2
(45) Date of Patent: Jun. 27, 2023

(54) SYSTEM AND METHOD FOR GENERATING AND OPTIMIZING ARTIFICIAL INTELLIGENCE MODELS

(71) Applicant: Actapio, Inc., Wenatchee, WA (US)

(72) Inventor: Shin-ichiro Okamoto, Wenatchee, WA (US)

(73) Assignee: Actapio, Inc., Wenatchee, WA (US)

( * ) Notice: Subject to any disclaimer, the term of this patent is extended or adjusted under 35 U.S.C. 154(b) by 667 days.

(21) Appl. No.: 16/552,882

(22) Filed: Aug. 27, 2019

(65) Prior Publication Data
US 2020/0293898 A1    Sep. 17, 2020

Related U.S. Application Data

(60) Provisional application No. 62/818,437, filed on Mar. 14, 2019.

(51) Int. Cl.
| | |
|---|---|
| *G06N 20/20* | (2019.01) |
| *G06N 3/086* | (2023.01) |
| *G06F 18/214* | (2023.01) |
| *G06F 18/21* | (2023.01) |
| *G06N 7/01* | (2023.01) |

(52) U.S. Cl.
CPC ........... *G06N 20/20* (2019.01); *G06F 18/214* (2023.01); *G06F 18/217* (2023.01); *G06N 3/086* (2013.01); *G06N 7/01* (2023.01)

(58) Field of Classification Search
CPC ........ G06N 3/086; G06N 7/005; G06N 20/20; G06N 3/126; G06K 9/6256; G06K 9/6262
See application file for complete search history.

(56) References Cited

U.S. PATENT DOCUMENTS

| | | | |
|---|---|---|---|
| 2015/0170048 A1 | 6/2015 | Lin et al. | |
| 2016/0306844 A1* | 10/2016 | Frank | G06N 7/005 |
| 2018/0240041 A1* | 8/2018 | Koch | G06F 16/24578 |
| 2020/0285989 A1* | 9/2020 | Jalalibarsari | G06F 9/44505 |
| 2021/0035128 A1 | 2/2021 | Benkreira et al. | |

FOREIGN PATENT DOCUMENTS

CN        106203628    *   7/2016

OTHER PUBLICATIONS

Machine translation for CN 106203628 (Year: 2016).*
Ariot et al., "A Survey of Cross-Validation Procedures for Model Selection," arXiv (2009), in 40 pages.

* cited by examiner

*Primary Examiner* — Qian Yang
(74) *Attorney, Agent, or Firm* — Procopio, Cory, Hargreaves & Savitch LLP

(57) ABSTRACT

A computer implemented method for generating and optimizing an artificial intelligence model, the method comprising receiving input data and labels, and performing data validation to generate a configuration file, and splitting the data to generate split data for training and evaluation; performing training and evaluation of the split data to determine an error level, and based on the error level, performing an action, wherein the action comprises at least one of modifying the configuration file and tuning the artificial intelligence model automatically; generating the artificial intelligence model based on the training, the evaluation and the tuning; and serving the model for production.

20 Claims, 35 Drawing Sheets

SYSTEM AND METHOD FOR GENERATING AND OPTIMIZING ARTIFICIAL INTELLIGENCE MODELS

CROSS-REFERENCE TO RELATED APPLICATIONS

This application claims benefit of priority from Provisional U.S. Patent Application No. 62/818,437, filed Mar. 14, 2019, the contents of which are incorporated by reference.

BACKGROUND

Field

Aspects of the example implementations relate to methods, systems and user experiences associated with generation and optimization of artificial intelligence models, while minimizing the manual intervention.

Related Art

In various related art schemes, artificial intelligence models have been developed. More specifically, data has been obtained, and models have been generated by use of machine learning. Significant manual activity, (e.g., human intervention, has been required in related art approaches for the generation of the artificial intelligence model, including obtaining of the data, and performing testing and evaluation on the data model.

However, the related art approach has various problems and disadvantages. For example, but not by way of limitation, manual activity associated with model generation results in providing access to entities, such as developers, programmers, analysts, testers and others, such that private data can be accessed. Information associated with purchases, spending habits, or other sensitive and/or private information may be accessed during testing and evaluation, training or other aspects of model generation. Thus, the end user may be at risk as a result of potential exposure of sensitive and/or private information. Further, other entities such as vendors or retailers may also be at risk, due to possible data or security breach, or access to sensitive business information.

Additionally, once the related art artificial intelligence models are generated, it is difficult to scale those models without requiring extremely large amounts of capacity, such as computing power, storage, etc. The reason for this related art difficulty is because the inputs and parameters associated with the artificial intelligence model are static, and are not capable of being modified or optimized in an efficient manner. For example, any optimization of the artificial intelligence model involves manual intervention. This requires additional time and resources that could be used for other activities. Further, the related art manual optimization approaches do not permit for optimization to a global optimal point, which may not be accessible to the manual optimizer.

Accordingly, there is an unmet need to address one or more of the forgoing related art problems and/or disadvantages.

SUMMARY

According to aspects of the example implementations, a computer-implemented method is provided for generating and optimizing an artificial intelligence model. The method includes receiving input data and labels, and performing data validation to generate a configuration file, and splitting the data to generate split data for training and evaluation, performing training and evaluation of the split data to determine an error level, and based on the error level, performing an action, wherein the action comprises at least one of modifying the configuration file and tuning the artificial intelligence model automatically, generating the artificial intelligence model based on the training, the evaluation and the tuning, and serving the model for production.

According to other aspects, the tuning comprises automatically optimizing one or more input features associated with the input data, automatically optimizing hyper-parameters associated with the generated artificial intelligence model, and automatically generating an updated model based on optimized one or more input features and the optimize hyper-parameters.

According to still other aspects, the one or more input features are optimized by a genetic algorithm to optimize combinations of the one or more input features, and generate a list of the optimize input features.

According to a further aspect, the automatically optimizing the hyper-parameters comprises application of at least one of a Bayesian and random algorithm to optimize based on the hyper-parameters.

According to a yet further aspect, the automatically optimizing the one or more input features is performed in a first iterative loop that is performed until a first prescribed number of iterations has been met, and the automatically optimizing the hyper-parameters and the automatically generating the updated model is performed in a second iterative loop until a second prescribed number of iterations has been met.

According to an additional aspect, the first iterative loop and the second iterative loop are performed iteratively until a third prescribed number of iterations has been met.

According to another aspect, the performing the training and the evaluation comprises execution of one or more feature functions based on a data type of the data, a density of the data, and an amount of the data.

Example implementations may also include a non-transitory computer readable medium having a storage and processor, the processor capable of executing instructions for for generating and optimizing an artificial intelligence model.

DETAILED DESCRIPTION

Figure 1:
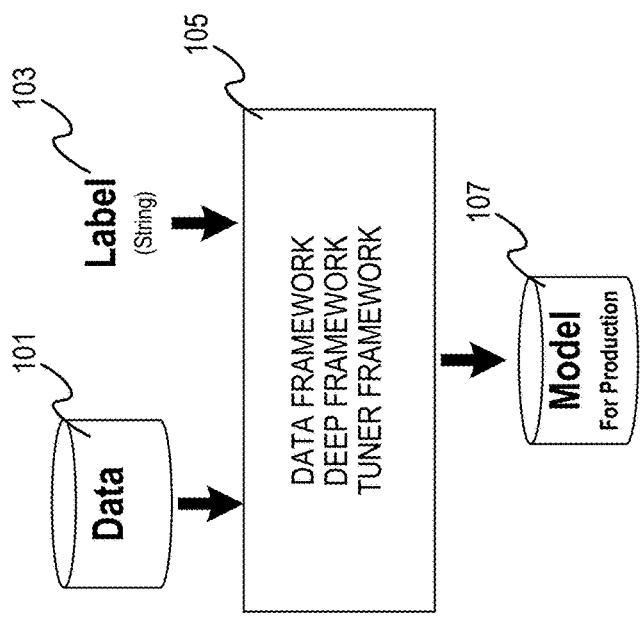
FIG. 1 illustrates a schematic of the example implementation.

The following detailed description provides further details of the figures and example implementations of the present application. Reference numerals and descriptions of redundant elements between figures are omitted for clarity. Terms used throughout the description are provided as examples and are not intended to be limiting.

The example implementations are directed to methods and systems for producing artificial intelligence models while minimizing the manual human intervention that has been required in related art approaches. More specifically, the example implementations include a data framework, a deep framework, and a tuner framework. The data framework includes data validation, generation of configuration file required for the deep framework, and/organization of the data for training, evaluation and testing. The deep framework (e.g., deep learning framework) provides for building of deep learning model for production, without requiring generation of additional code. The tuner framework provides for optimization of one or more hyper-parameters, and combinations thereof, with respect to the data framework, and combining of the input feature, the feature type and the model type. For example, but not by way of limitation, the present example implementations may be executed by use of TensorFlow 1.12.0 or greater, and using Python 2.7 or Python 3.X; other implementations as would be understood by those skilled in the art may also be substituted therefor, without departing from the inventive scope.

FIG. 1 illustrates a schematic 100 of the example implementation. According to the schematic 100, data 101 and labels 103 are provided as inputs. For example, but not by way of limitation, the data 101 may be in TSV TFRecord or HDFS format, and the labels 103 may be provided as strings. At 105, the data framework, deep framework and tuner framework are represented. As an output 107, a model is provided for production, such as the TensorFlow serving model. By way of a single command, the example implementations shown at 105 herein may be executed, such as by a user, for example.

Figure 2:
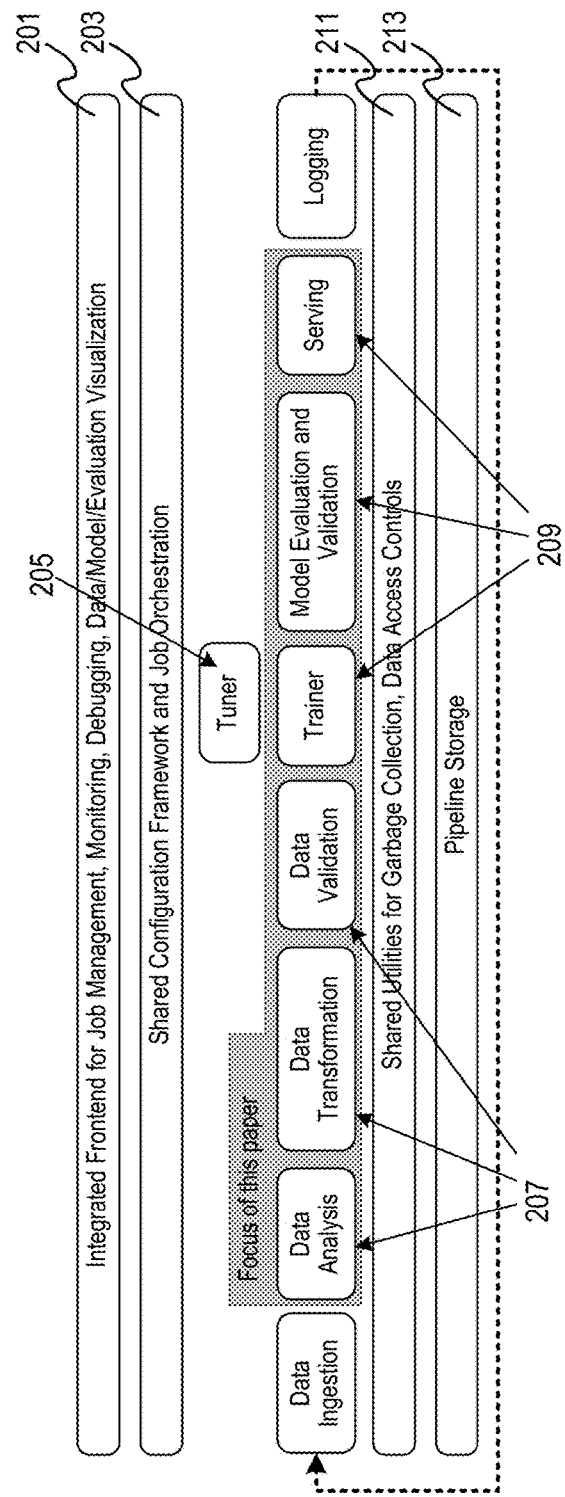
FIG. 2 illustrates a schematic of an example implementation in a context of TensorFlow Extended

In the context of TensorFlow Extended, the present example implementations may optionally be integrated as follows. More specifically, and as shown in FIG. 2 at 200, TensorFlow extended provides an integrated front end 201 for job management, monitoring, debugging and data/model/evaluation visualization, as well as a shared configuration framework and job orchestration at 203. The present example implementations integrate a tuner framework 205 therein. Additionally, the data framework 207 provides data analysis, data transformation and data validation, while the deep framework 209 provides the trainer, model evaluation and validation, and serving. Further, the example implementation may integrate with TensorFlow aspects such as shared utilities for garbage collection and data access controls at 211, as well as pipeline storage at 213. Accordingly, an artificial intelligence model can be created for production, with only a configuration file and the initial data.

As explained herein, the example implementations provide for automatic optimization. For example, but not by way of limitation, optimization may be performed with respect to input feature combination, input feature column type, input cross feature, as well as input embedding size. Further, optimization may also be performed with respect to model selection, model architecture, model network/connection, model hyper-parameter, and model size.

Figure 3:
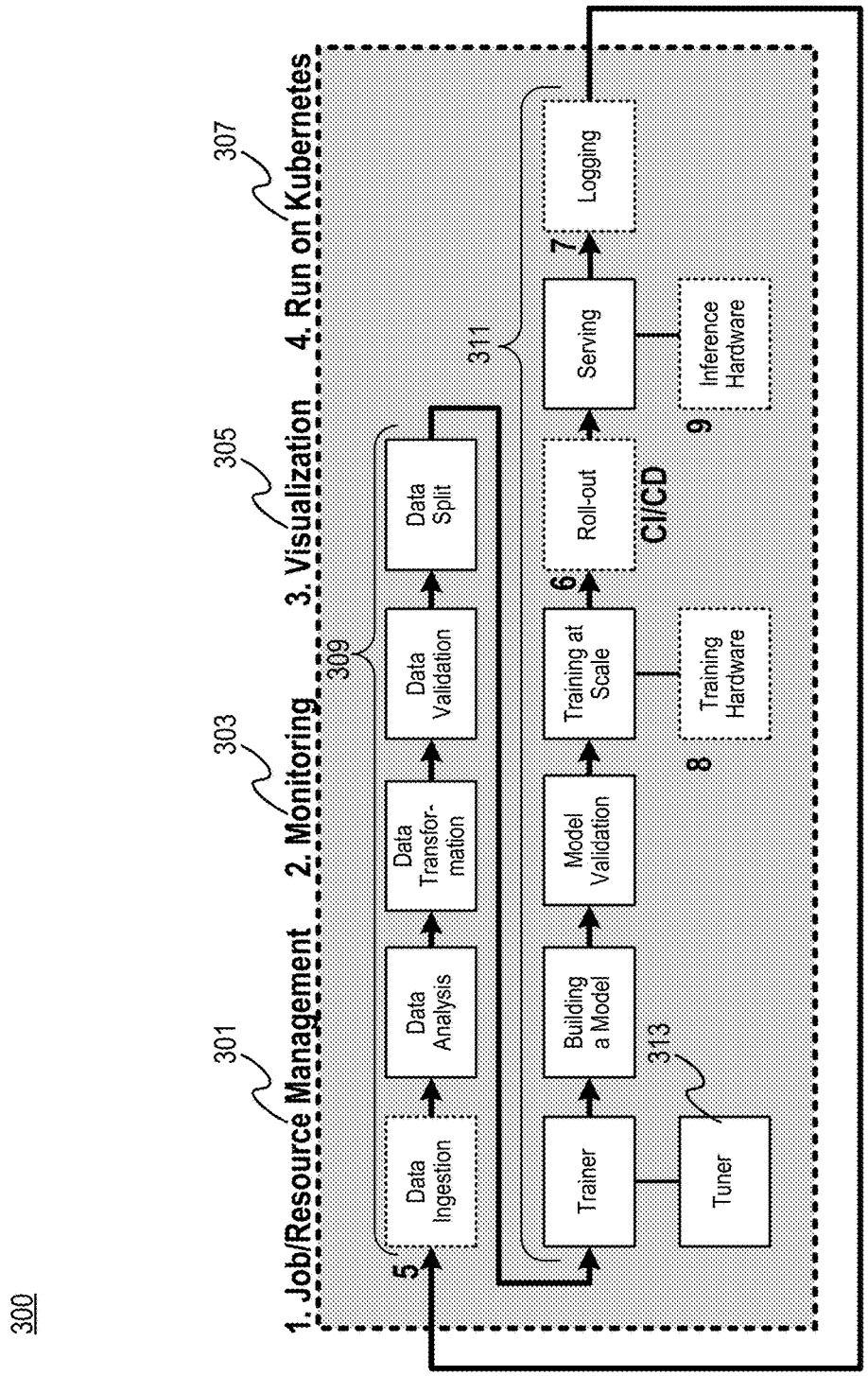
FIG. 3 illustrates stages of the artificial intelligence framework according to an example implementation.

With respect to the pipeline according to the example implementations, the artificial intelligence framework, as may be integrated with TensorFlow Extended, provides for various stages. FIG. 3 illustrates stages of the artificial intelligence framework 300 according to an example implementation. For example, but not by way of limitation, the stages may include job/resource management 301, monitoring 303, visualization 305, and execution 307 (e.g., on Kubernetes), which are followed by data framework 309, deep framework 311 and tuner framework 313, which are in turn followed by rollout and serving, logging, training hardware and inference hardware. For example but not by way of limitation, the data framework 309 may include (following data ingestion), data analysis, data transformation, data validation and data split. The deep framework 311 may include a trainer, building a model, model validation, training at scale, interfacing with training hardware, rollout, serving interfacing with logging and interference hardware, for example.

According to an example architecture, a data configuration file and input data in tab separated value or TSV format are provided to the data framework. The data framework performs data validation, to generate a configuration file for the deep framework that includes a schema, feature, model and cross feature files, as well as a validation report. The data framework also splits the data for training, evaluation, and optionally, testing and/or prediction.

The output of the data framework is provided to the deep framework. The deep framework performs training, evaluation and testing, serving of the model export, model analysis and serving, with an output to the model for production, as well as a model analysis report.

The configuration file is also provided to the tuner framework, which, using an optimizer configuration file, provides optimization of input feature and hyper-parameter, auto selection of model and automated machine learning.

In terms of the execution of the foregoing architecture, operations are provided as follows. First, input data is prepared, such as providing in TSV format without header, or TSV format without header and a schema configuration file. Next, data validation is performed and the configuration file for the deep framework is exported. Further the data is split for training, evaluation and testing, by the data framework. Then, a confirmation is provided as to whether training can be executed by the deep framework. Further, the tuner framework may perform optimization of hyper-parameter and the combination of input feature, feature type and model type. Subsequently, model serving (e.g., providing a prediction or by application of the model, using the output probability) and inference may be performed by the deep framework.

Figure 4:
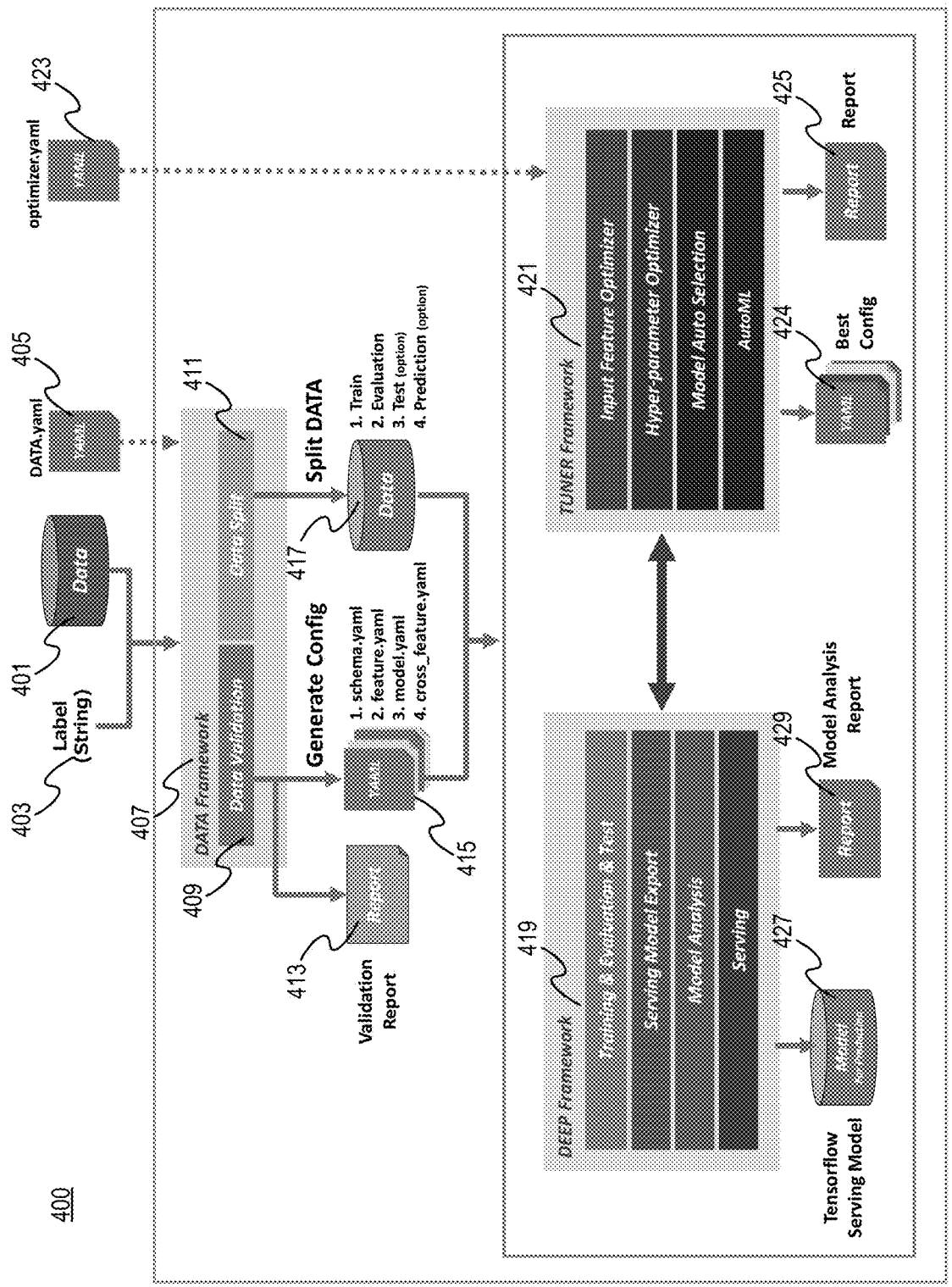
FIG. 4 illustrates an overall architecture of the example implementations.

FIG. 4 illustrates an overall architecture 400 of the example implementations. As noted above, data 401 and labels 403 are provided as inputs; an input data configuration file 405 may also optionally be provided. At the data framework 407, data validation 409 and data splitting 411 are performed. As a result of the data validation 409, a validation report 413, as well as the configuration file 415 for the deep framework, are generated. At the data splitting 411, the data is split as shown at 417 for training, evaluation and optionally, testing and prediction.

The outputs of the data framework to the deep framework 419 are the configuration file 415 and the split data 417. At the deep framework 419, training and evaluation and testing, serving model export, model analysis and serving are performed. Further, the tuner framework 421 interfaces with the deep framework 419, as explained in greater detail below. The tuner framework automatically optimizes input feature and hyper-parameter, and provides automatic selection of the model. Optionally, an optimizer configuration file 423 may be provided. As an output, the tuner framework 421 provides a best configuration file 424, for optimizing the model, as well as a report 425. The deep framework 419 provides as its output the serving model 427 for production, as well as a model analysis report 429.

The foregoing example implementations may be performed by way of a non-transitory computer readable medium containing the instructions to execute the methods and systems herein. For example, but not by way of limitation, the instructions may be executed on a single processor in a single machine, multiple processors in a single machine, and/or multiple processors in multiple machines. For example, in a single server having a CPU and a GPU, the example implementations may execute the instructions on the GPU; with a single server having multiple GPU's, the processing may be performed in a parallelized format using some or all of the GPU's. In multi GPU, multi-server environments, load-balancing techniques may be employed in a manner that optimizes efficiency. According to one example implementation, the kukai system, developed by Yahoo Japan Corporation, may be employed.

With respect to the data framework, as disclosed above, data validation, generation of a configuration file deep framework, and splitting of the data for training, evaluation and testing is performed. The example implementations associated with these schemes are discussed in greater detail below.

For example, but not by way of limitation, Deep Framework 1.7.1 or above may be used with the data framework according to the example implementation; however, other approaches or schemes may be submitted therefor in the example implementations, without departing from the inventive scope. Further, as an input to the data framework, a data file may be provided. In the present example implementations, the data format may support TSV, and specification of a better is provided in the first line of the data file, or in the Deep Framework schema.yaml. Further, the data configuration file is provided as DATA.yaml.

According to the data validation of the framework, data validation is performed as explained below. The data validator includes a function that specifies the columns to be ignored. Once the columns to be ignored are specified, those columns will not be exported to the configuration files. Optionally, a column may be weighted. More specifically, if a number of each of the label classes in the data is not uniform the weight column may improve performance of the model. More specifically, the weight column may be multiplied by a loss of the example. Semantically, the weight column may be a string or a numeric column that represents weights, which is used to down weight or boost examples during training. The value of the column may be multiplied by the loss associated with the example. If the value is a string, it may be used as a key, to fetch weight tensor from the features; if the value of the column is numerical, a raw tensor is fetched, followed by the application of a normalizer, to apply the weight tensor. Further, a maximum number of load records may be specified.

Additionally, a threshold of a density ratio may be specified, to distinguish between contiguous and sparse density as explained below, to implement this function. Similarly, a threshold of the maximum value to distinguish between small and large values in contiguous data maybe specified, as well as a threshold of a unique count to distinguish between small and large values sparse data may be provided. Also, the column name of the user ID may be specified, to report the relationship between a recount out and a user.

As a part of the data validation, a threshold of the unique count to distinguish small and large values of data may be provided, as well as a threshold of the count to distinguish large and very large values. Optionally, a number of buckets may also be specified. Two types of boundaries associated with the bucketizing function are outputs, as explained below. A first boundary defined a difference between a maximum value and a minimum value by the specified number. The second boundary defines to divide into buckets of approximately equal size. The actual number of buckets to be calculated may be less than or greater than the request number. These boundaries may be used for optimization of feature functions of the model optimizer, as explained below.

Additionally, the data framework provides for splitting the data into training, evaluation and test data. For example, but not by way of limitation, a ratio of each data file may be specified, such that the total value must sum up to 1.0. Alternatively, the ratio may be calculated automatically, based on data size. Further, and optionally, data export of a record to each data file may be performed, based on its value being set to "true". Additionally, the data set may be split for each user ID with a specified ratio based on a column name of the user ID, and the data set may be split after sorting based on timestamp, by specifying the column name of the timestamp.

According to an example implementation, operation of the data framework may be provided as follows. Initially, an operation is performed to validate the data and the deep framework configuration files, in view of the foregoing example implementation for data validation functions. After the data validation operation is performed, a report and histogram file may be generated and reviewed. For example, but not by way of limitation, the validation report may provide information on data errors, or warnings with respect to certain issues with the data. Further, a report log may be generated that provides information such as density.

After checking the validation report and histogram file, the deep framework configuration files may be verified. Further, an operation may be performed to split the data, followed by comparison of the training data and the evaluation data. The results of the comparison may be verified as well.

Figure 5A:
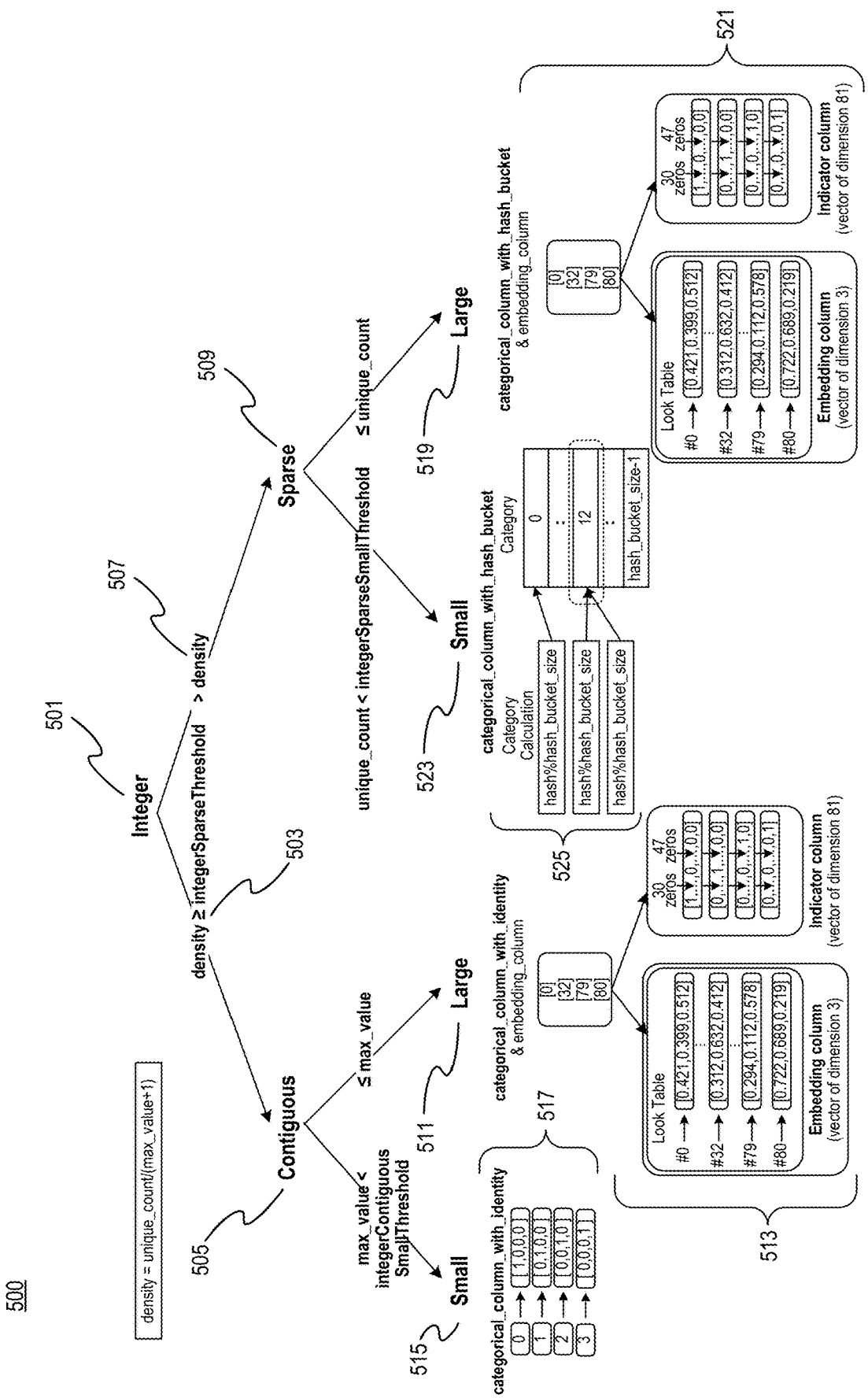
FIGS. 5A and 5B illustrate an example implementation of a feature function selection algorithm.
Figure 5B:
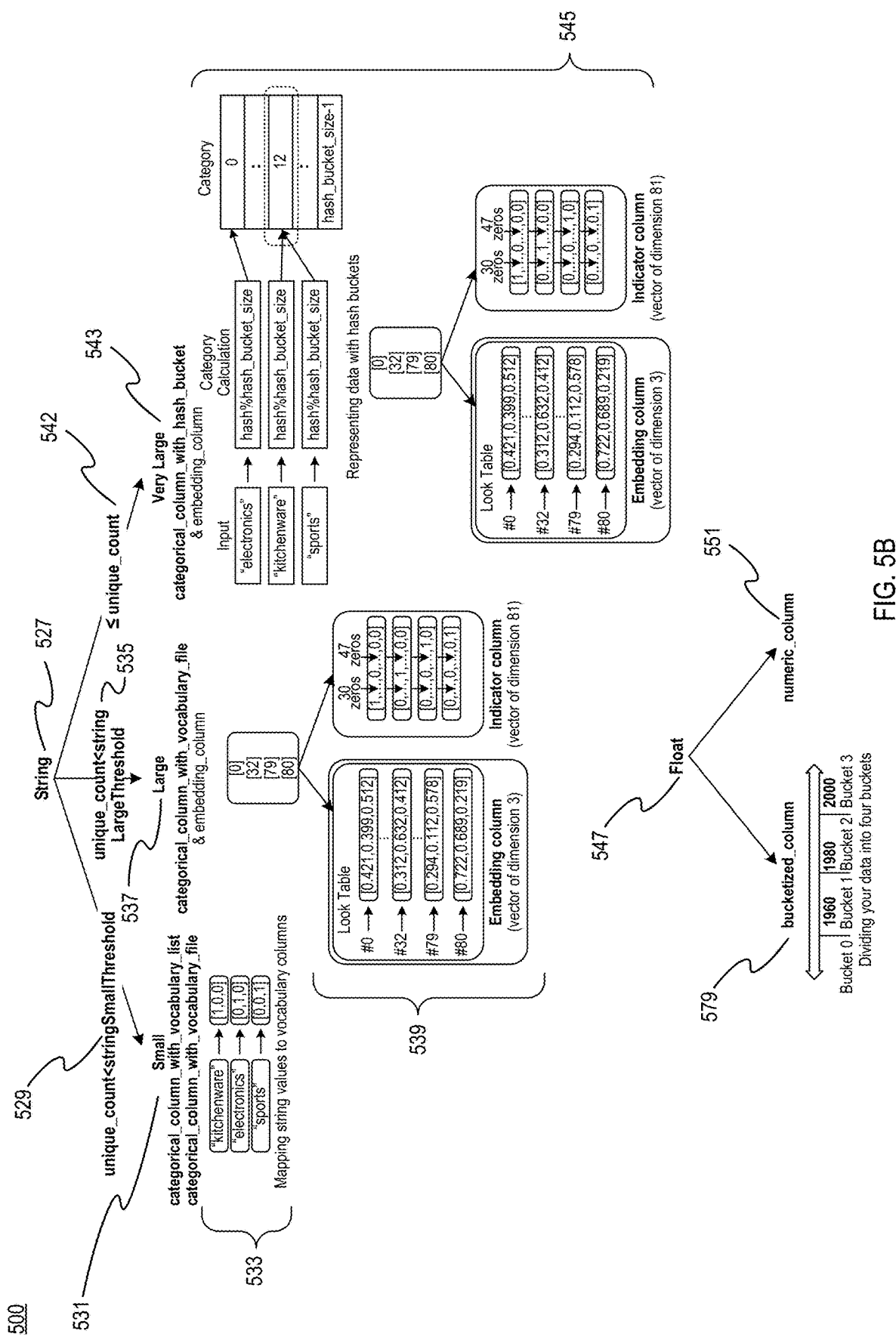

According to an example implementation, a feature function selection algorithm is provided as follows. FIGS. 5A and 5B illustrate an example implementation of the feature function selection algorithm 500. For an integer type of data, at 501, a density is determined based on a ratio of the unique count with respect to a maximum value+1. If the density is determined to be greater than or equal to a threshold at 503, the data is characterized as contiguous at 505. If the density is determined to be less than the threshold at 507, the data is characterized as sparse at 509. For the data being characterized as contiguous at 505, a determination is made as to whether the maximum value is greater than or equal to a small threshold value. If so, the contiguous data is characterized as large at 511, and a categorical column with identity is executed, as well as an embedding, at 513. On the other hand, if the maximum value is determined to be less than the small threshold value, the data is characterized as contiguous and small at 515, and is executed with a categorical column with identity at 517.

For sparse data as determined at 509, the unique count of the data is compared to a threshold. If the unique count is determined to be greater than or equal to the threshold at 509, the data is characterized as large and sparse at 519, and is provided with a categorical column with a hash bucket and an embedding column executed at 521. On the other hand, if the unique count is determined to be less than the threshold, the data is characterized as small and sparse at 523, and provided with a categorical column with hash bucket executed at 525.

For string type data as determined at 527, the unique count is compared to a small threshold. If it is determined that the unique count is less than the small threshold at 529, the string data is determined to be small at 531, and is provided with a categorical column with the vocabulary list and categorical column with vocabulary file executed at 533. If the unique count is determined to be less than a large threshold at 535, then the string data is determined to be large at 537, and is provided with a categorical column with vocabulary file, and an embedding column executed at 539. If the unique count is greater than or equal to the large threshold at 541, the string data is determined to be very large at 543, and is provided with a categorical column with a hash bucket and the embedding column executed at 545.

For float type data as determined at 547, the data is characterized as either a bucketized column executed at 549 or a numeric column executed at 551.

With the respect to the obtaining of the data for the data framework, a user may provide information such as ID, timestamp, location, etc. from the information associated with the user equipment, such as a mobile phone or the like. Similarly, operating system information may be obtained from the IP address, the MAC address or other available information associated with the user equipment that is accessible to the system. Demographic information, such as gender, age, job or the like may be obtained, with the consent of the user from the user profile data. Further, it should be noted that the user ID and additional information may be encrypted, such that the developer is not able to determine an identity of the user, based on one or more types of information associated with the user.

With respect to the splitting of the data, for machine learning methods, data needs to be trained and evaluated, such that the training data and evaluation data must be prepared separately. As explained above, the data framework provides the training data and the evaluation data. According to the example implementations, the training data and the evaluation data may overlap. Further, testing may be done in an iterative manner, and data may be shuffled on each iteration, to provide for optimal data testing performance.

As explained below, the deep framework provides for data training, which is automatically executed without the requirement of the user or developer to provide code. As also explained herein, a mechanism or method is provided for detecting, for string, integer and float types of data, characteristics of the data, such as small or large, as well as density related information.

Accordingly, as an output of the data framework, information on the model, schema, feature, cross feature and data itself, split for training, evaluation testing, and optionally, prediction is provided. Based on this information, the deep framework is implemented as explained below.

Figure 6:
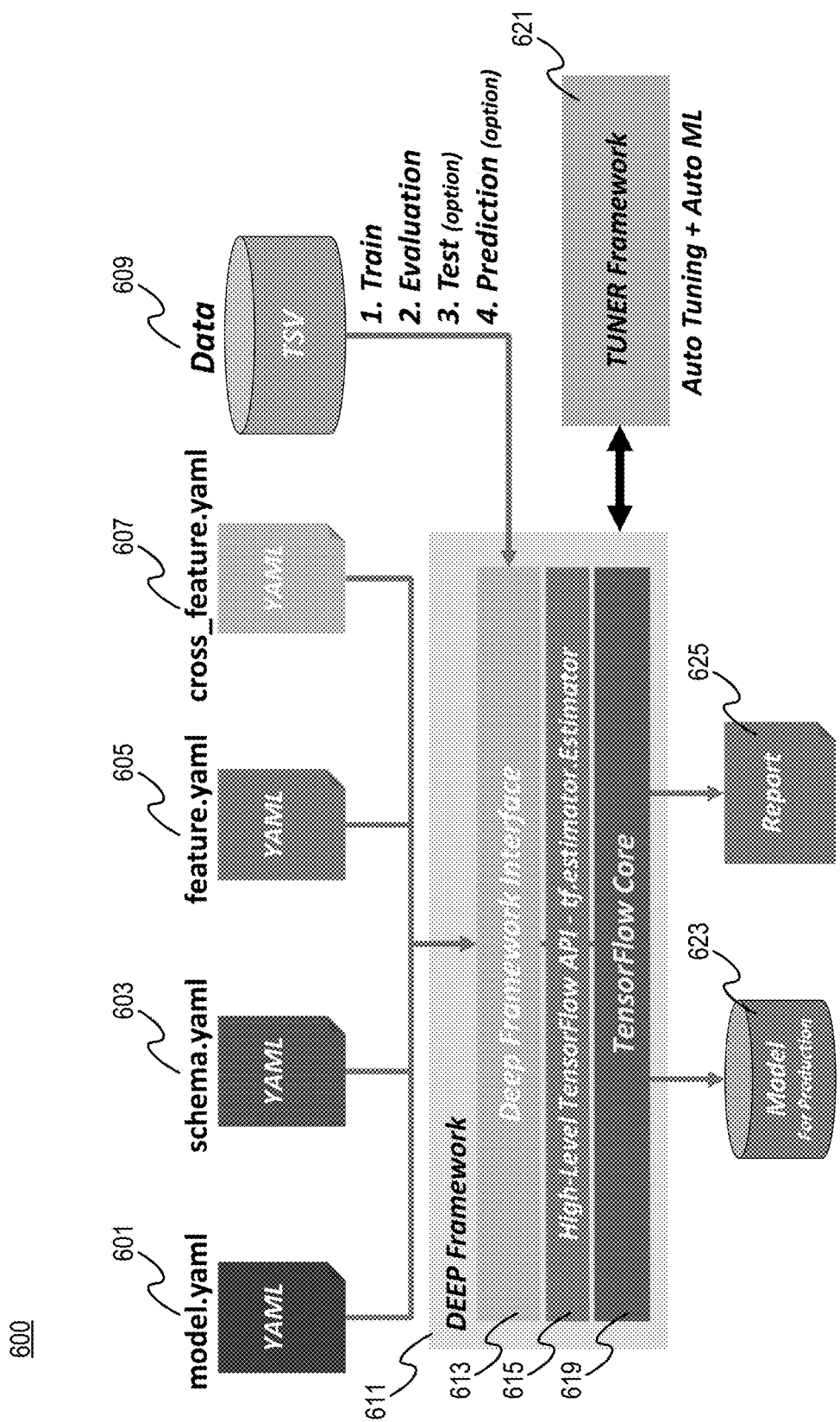
FIG. 6 illustrates a deep framework architecture according to an example implementation

As shown in FIG. 6, the deep framework architecture 600 involves receiving configuration files (for example, model, schema, feature and cross feature configurations 601-607) and data 609 as explained above, by way of the deep framework 611 having an interface 613. Further, the deep framework 611 an estimator 615 is provided, a core 619 that interfaces with the tuner framework 621, explained further below, as well as a production model 623 and a report 625.

Figure 7:
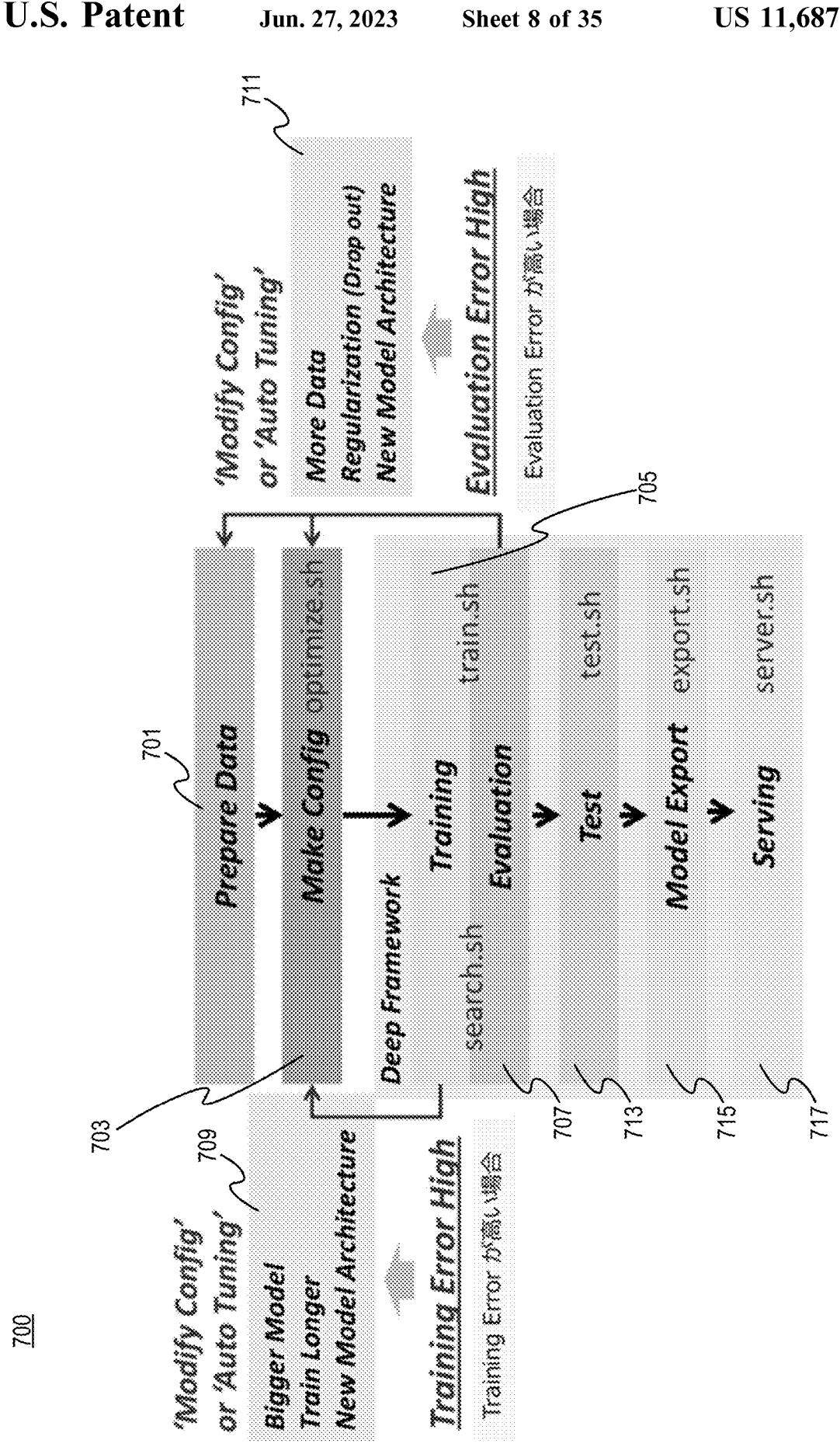
FIG. 7 illustrates operations associated with the deep framework according to the example implementation.

More specifically, and as shown in FIG. 7, a series of operations 700 associated with the deep framework is provided. The data framework prepares the data at 701, and makes the configuration file at 703. The deep framework includes training 705 and evaluation 707 based on the configuration file received from the data framework. If the training error is high, the feedback to the data framework is to provide a bigger model, a longer training, and/or a new model architecture, or to perform auto tuning by the tuner framework, as shown at 709. If the evaluation error is high, the feedback to the data framework is to provide a modified configuration file that incorporates more data, provides for regularization, and/or a new model architecture, or to perform auto tuning by the tuner framework, as shown at 711. Once the training and evaluation by the deep network is completed, then the phases of testing at 713, model export at 715 and serving at 717 are performed.

As explained above, the input data file is provided, optionally in TSV format, without header and TFRecord. Optionally, the example implementations may include approaches for converting between TSV and TFRecord, such as by use of a conversion function, and by specifying a number of export records to be converted, and optionally a schema file, if the input TSV file does not include a header.

The configuration file is provided as having a schema file, including a column ID and a column name, with the ordering being consistent with the input data file and the column names being sensitive. The deep framework may convert the configuration file into a function, such as a TensorFlow function. More specifically, by using the column name as the key, the parameter name and the function name may be preserved while transforming the configuration file into a function. Further, some portions may be omitted or set to a default.

Once the function is generated and provided with a numerical reference, it may be used for automatic optimization of the feature function associated with the model optimizer, and may specify as many values as needed. This is explained above with respect to the feature function algorithm and the buckets associated with the data framework.

One or more basic feature functions may be provided. These feature functions may be selected for use based on the feature function algorithm as explained above with respect to the data framework. For example, a function of categorical column with identity and categorical column with identity and embedding column may be used when the inputs are integers within a range from zero to a number of the buckets. A feature function of categorical column with hash bucket and categorical column with hash bucket and embedding column may be used when there is a sparse feature, and IDs are set by use of hashing. A feature function of categorical column with vocabulary list and categorical column with vocabulary list and embedding column may be used when the inputs are in string or integer format, and an in memory vocabulary mapping is provided each value to an integer ID.

A feature function of categorical column with vocabulary file and categorical column with vocabulary file and embedding column may be used when the inputs are in string or integer format, and a vocabulary file is provided that maps each value to an integer ID. A feature function of numerical column is provided where the data represents valued or numerical features, and a feature function of bucketized column is provided to the data represents discretized dense input. Additionally, sequence feature functions may be provided, with respect to one or more of the feature functions above, to handle sequences of values.

Figure 8:
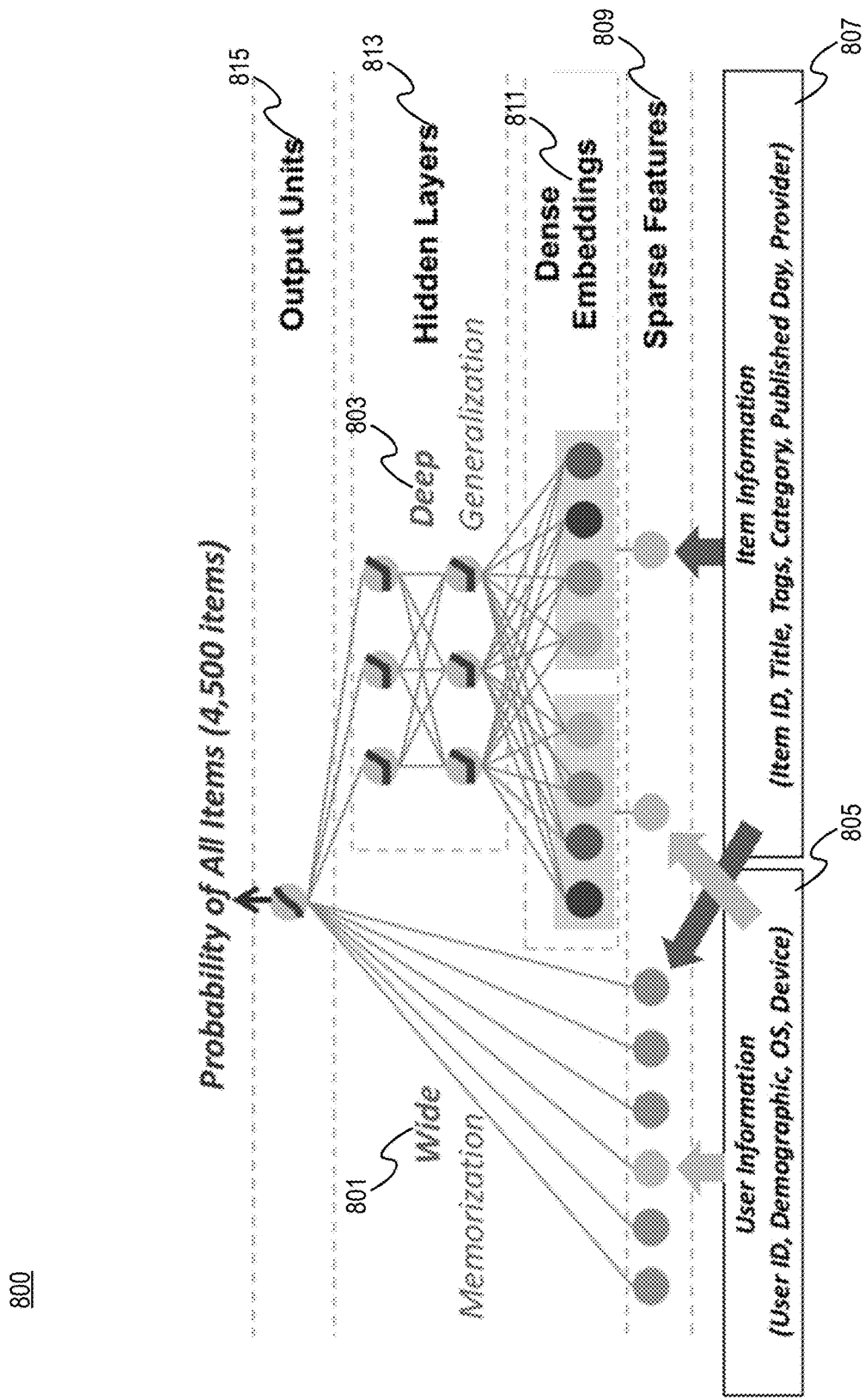
FIG. 8 illustrates the model file according to the example implementation.

As shown in FIG. 8, with respect to the model file, the model 800 may be linear, such as a wide model 801, a deep model 803, or a combination of a wide model and the deep model. The model setting may include one or more classifier classes, and one or more regression classes. In the context of a personalized recommender system, user information 805, such as user ID, demographic, operating system, and/or user device or equipment, may be provided as well as item information 807, such as item ID, title, tags, category, date of publication, and provider.

The feature function operation may be performed as explained above, and sparse features may have an operation performed thereon accordingly, at 809, and the wide model 801 or the deep model 803, or a combination thereof, may be executed, depending on an output of the feature function operation. At 811, for dense embeddings, additional operations may be performed based on a result of the feature function determinations as explained above for the implementation of the deep model 803, and additional operations may be performed as indicated as hidden layers 813. Further, output units 815 are provided, such as for the serving model.

In summary, the user information and the item information is provided to the data framework, and determinations are made as to the sparseness of the features. Where features are sufficiently dense, as explained with respect to the feature function model above, dense embeddings are performed, and deep generalization is performed to generate outputs by way of hidden layers. Alternatively, in the absence of dense embedding, wide memorization may be performed to also generate outputs. The output units may provide a probability result for any or all of the items.

Figure 9A:
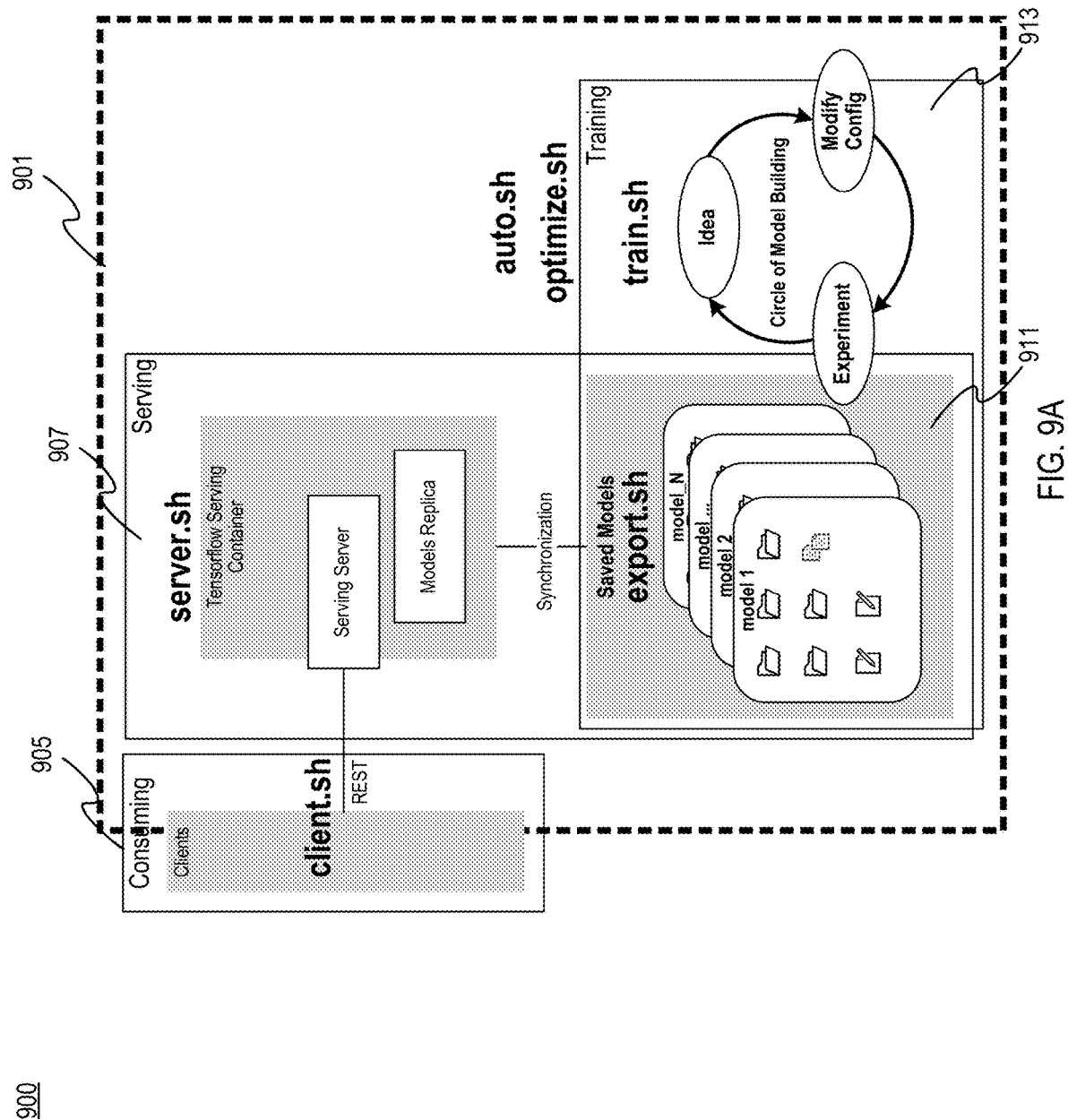
FIGS. 9A and 9B show APIs according to the example implementations.
Figure 9B:
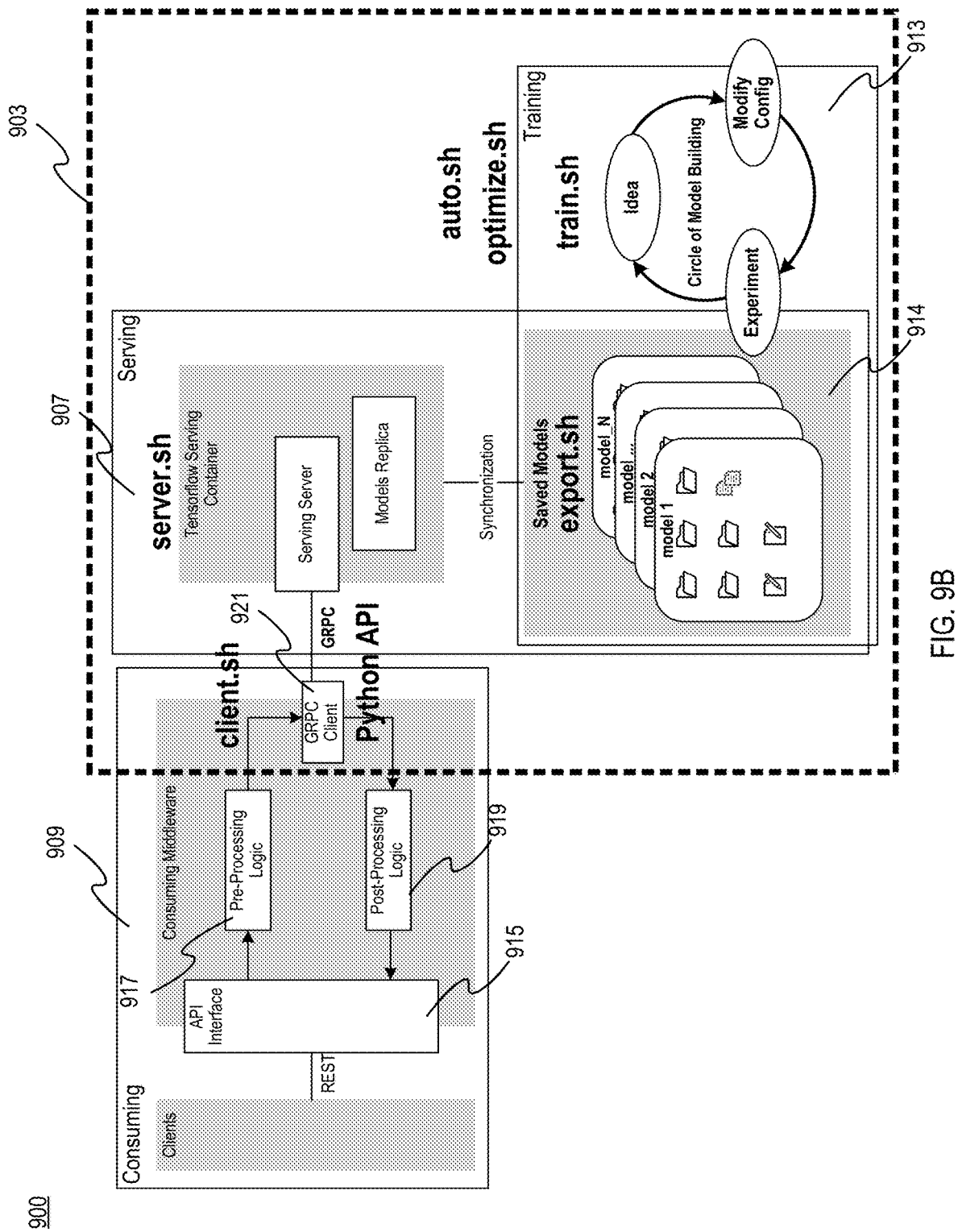

To provide support for the deep framework, one or more APIs may be provided. FIGS. 9A and 9B show the APIs 900 according to the example implementations. For example, but not by way of limitation, an API may be provided in REST at 901, including a client input 905 to a serving server 907, such as a TensorFlow serving container, that also generates a model replica, and is synchronized with served models 911. Further, the API provides for training 913 by way of model building, that includes experimentation, idea generation, and modification of the configuration file based on the generated idea. Additionally, a Python API (e.g., gRPC) may be provided at 903, similar to the REST API with respect to the elements 907, 911 and 913. Additionally, the Python API may include an API interface 915 with the information from the client, middleware consisting of preprocessing logic 917 and postprocessing logic 919, as well as a gRPC client 921.

Figure 10A:
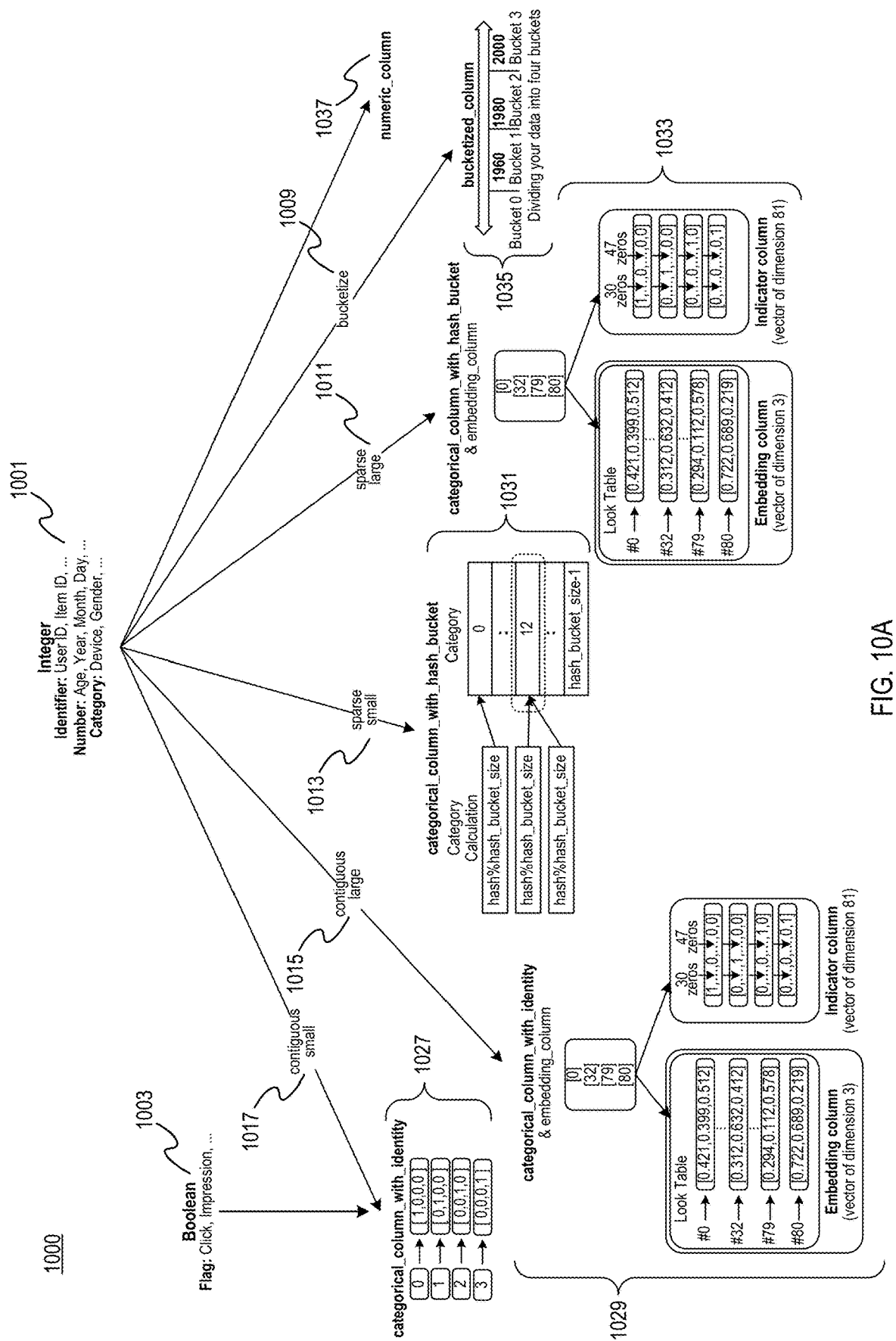
FIGS. 10A and 10B illustrate an example implementation showing a mapping of the different datatypes as they may be mapped to various data density determinations, and the associated feature functions that may be implemented.
Figure 10B:
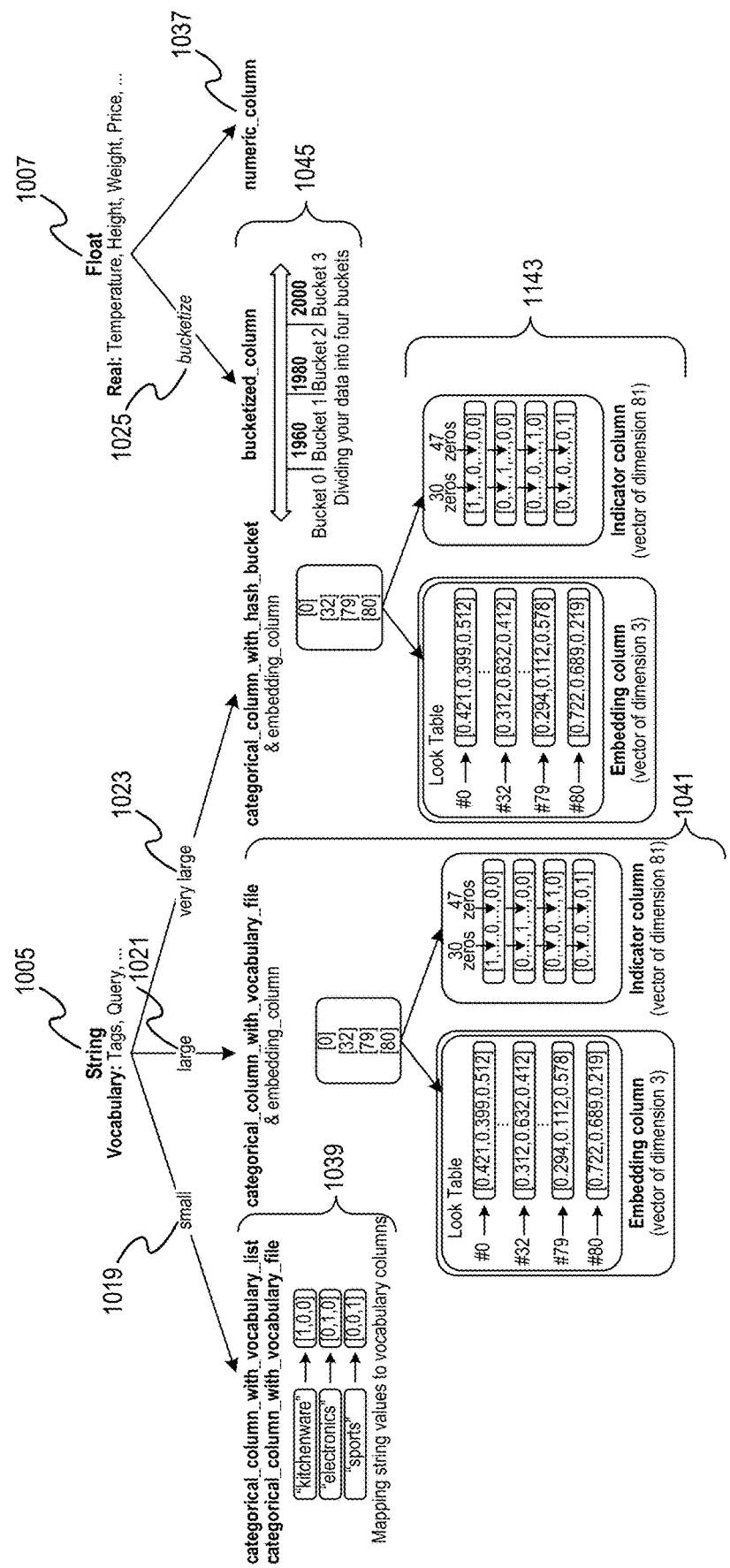

FIGS. 10A and 10B illustrate an example implementation showing a mapping 1000 of the different datatypes as they may be mapped to various data density determinations, and the associated feature functions that may be implemented. For example, integer datatype is shown at 1001 to include an identifier, such as the user ID or the item ID, a number, such as age, year, month, day, etc. and a category, such as device, gender, OS, etc. Further, Boolean datatype is shown at 1003 as being of a flag type such as click; string data is shown at 1005 as being of a vocabulary type, including tags, query, etc.; and float data is shown at 1007 as being of a real number value type, such as temperature weight, height, price, etc.

When the data is determined to include data that is contiguous and of a small amount at 1017, a feature function of categorical column with identity is applied at 1027. Where the data is determined to be contiguous and large at 1015, a feature function of categorical column with identity, as well as embedding, is applied at 1029. Where the data is determined to be sparse and small at 1013, a feature function of categorical column with hash bucket is applied at 1031. For the data is determined to be sparse and large, a feature function of categorical column with hash bucket and embedding is performed at 1033. Where the data is determined to be bucketized to at 1009, the data is considered to be bucketized column as a feature function at 1035. Where none of the forgoing data determinations apply, the data is characterized as a numeric column at 1037.

Additionally, for datatypes that are of a string value, where the data is determined to be small at 1019, the feature function of categorical column with vocabulary list and categorical column with vocabulary file are applied at 1039. Where the data is determined to be large at 1021, the feature function of categorical column with vocabulary file and embedding is applied at 1041. Where the data is determined to be very large at 1023, the feature function of categorical column with hash bucket and embedding column is applied at 1043.

For datatypes that are of a float type as determined at 1007, where it is determined that the data is bucketized at 1025, a feature function of bucketized column is applied at 1045. Otherwise, the feature function of numerical column 1037 is applied for the data of the float type.

For example, but not by way of limitation, a baseline classifier may be provided that establishes a simple baseline, ignoring feature values, and provided for predicting an average value of each label. For single label problems, the baseline classifier may predict a probability distribution of the classes as seen in the labels; for multi-label problems, the baseline classifier may predict a fraction of examples that are positive for each class.

Additionally, a linear classifier may be provided to train a linear model to classify instances into one of multiple possible classes. For example, but not by way of limitation, when the number of possible classes is 2, this is a binary classification. Further, a DNN classifier may be provided to train DNN models to classify instances into one of multiple possible classes, such that when the number of possible classes is 2, this is a binary classification. Additionally, a combined linear and DNN classifier may be provided, which combines the above linear and DNN classifier models. Further, a classifier may be provided or combined with models such as AdaNet. Tensor flow RNN models to train a recurrent neural network model to classify instances into one of multiple classes, or other classifiers (e.g., DNN with residual networks, or automatic feature interaction learning with self-attentive neural networks) as would be understood by those skilled in the art.

Similarly, regressors may be provided for the foregoing classifiers, that can ignore feature values to predict an average value, provide estimation, or the like.

The model may include one or more functions. For example, but not by way of limitation, the one or more functions may include stop functions, which stop the training under certain conditions, such as if a metric does not decrease within given max steps, does not increase within given max steps, is higher than a threshold, or is lower than a threshold, The forgoing examples are not intended to be limiting, and other functions may be included as would be understood by those skilled in the art.

As explained above, training and evaluation may be performed with the data set and configuration file. Such training and evaluation can be run on a single machine having a CPU or a GPU, wherein the GPU will automatically be used if available. Further, the process may be parallelized to multiple devices, and a prescribed number of GPU's or CPUs may be specified. The processing may be executed in the background, with a console log being displayed, and an option to stop processing.

According to the example implementations, the testing model is run, and the prediction model is run, followed by a model analyzer. Then, an export is performed to the cervical model, and the model server is started, followed by the running of the inference, with the REST and python APIs as explained above.

Optionally, TensorBoard may be used to visualize the deep framework. For example, upon execution, TensorBoard may be browsed, and training and evaluation data graphically viewed, as well as a graph being provided of the operations, as well as representation of the data.

Figure 11:
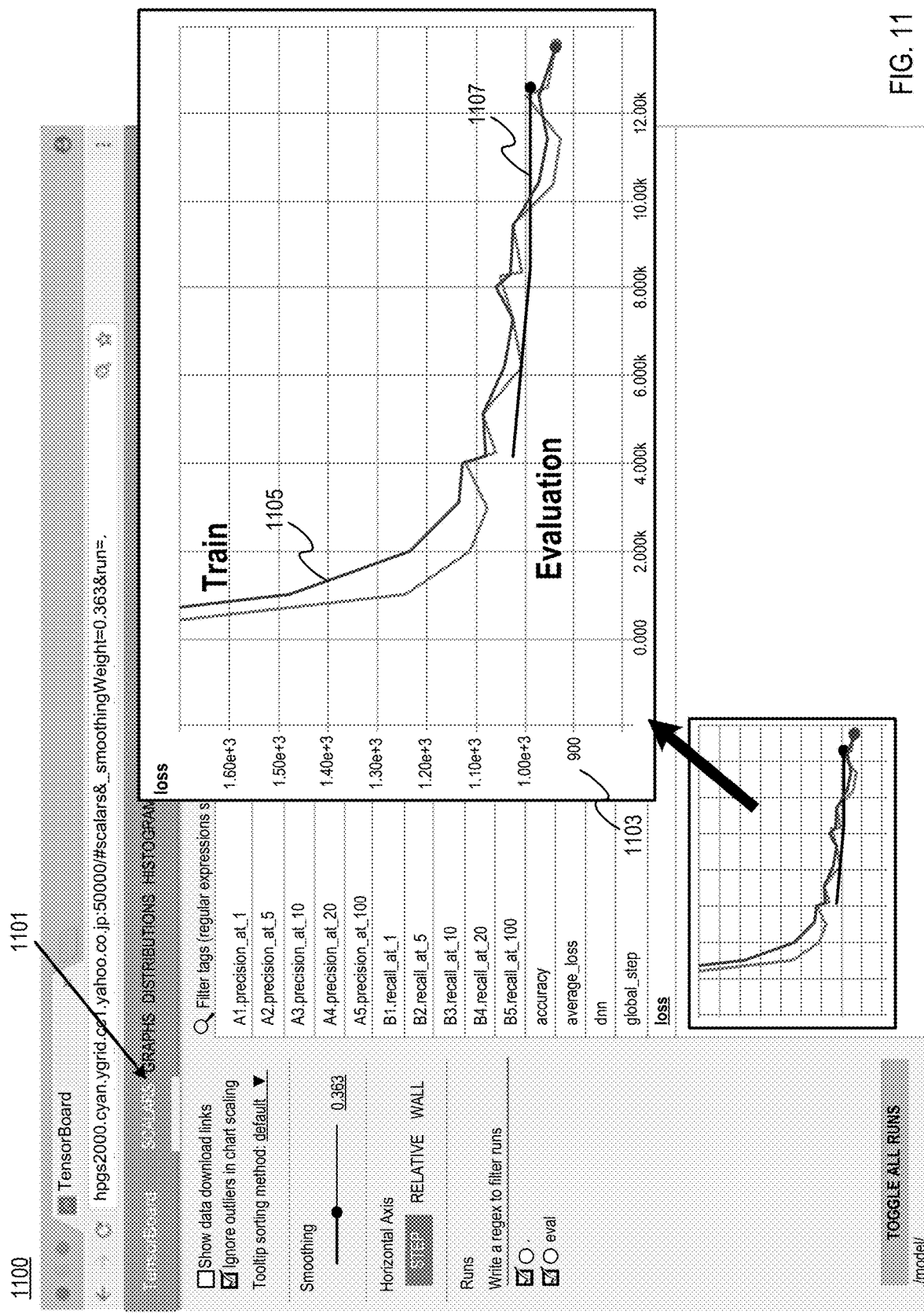
FIG. 11 illustrates an example user experiences associated with the example implementations.

For example, FIG. 11 illustrates an example user experiences associated with the example implementations employing TensorBoard. At 1101, the user selects "scalars". At 1103, a comparison of training and evaluation data is displayed in graphical form. At 1105 and 1107, curves for training data and evaluation data, respectively, are illustrated, as a representation of loss.

Figure 12:
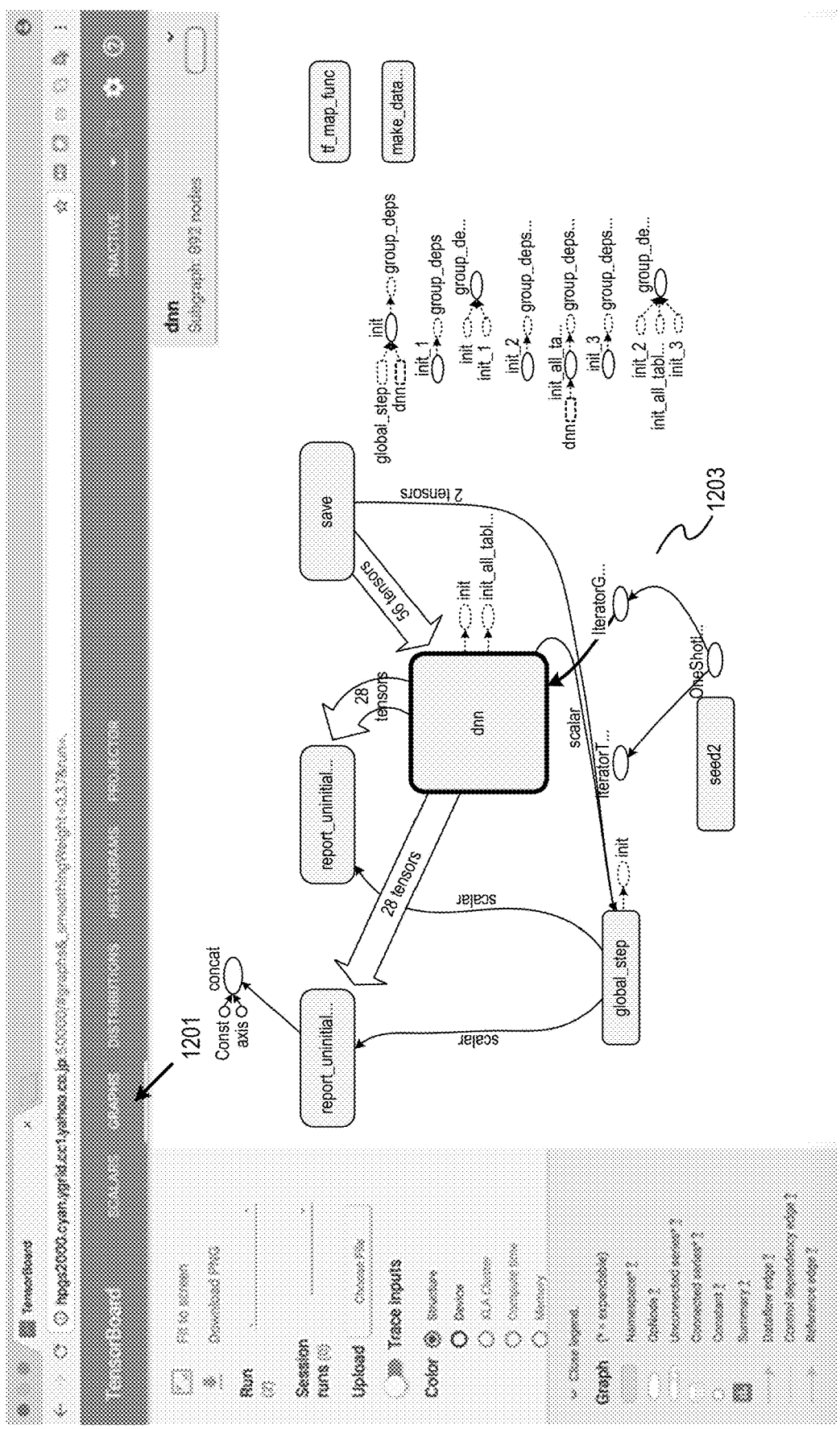
FIG. 12 illustrates another example user experience.

FIG. 12 illustrates another example user experience. More specifically, at 1200, a representation of the trace structure is shown, wherein the user has selected "graphs" at 1201. At 1203, the relationships between the entities are graphed.

Figure 13:
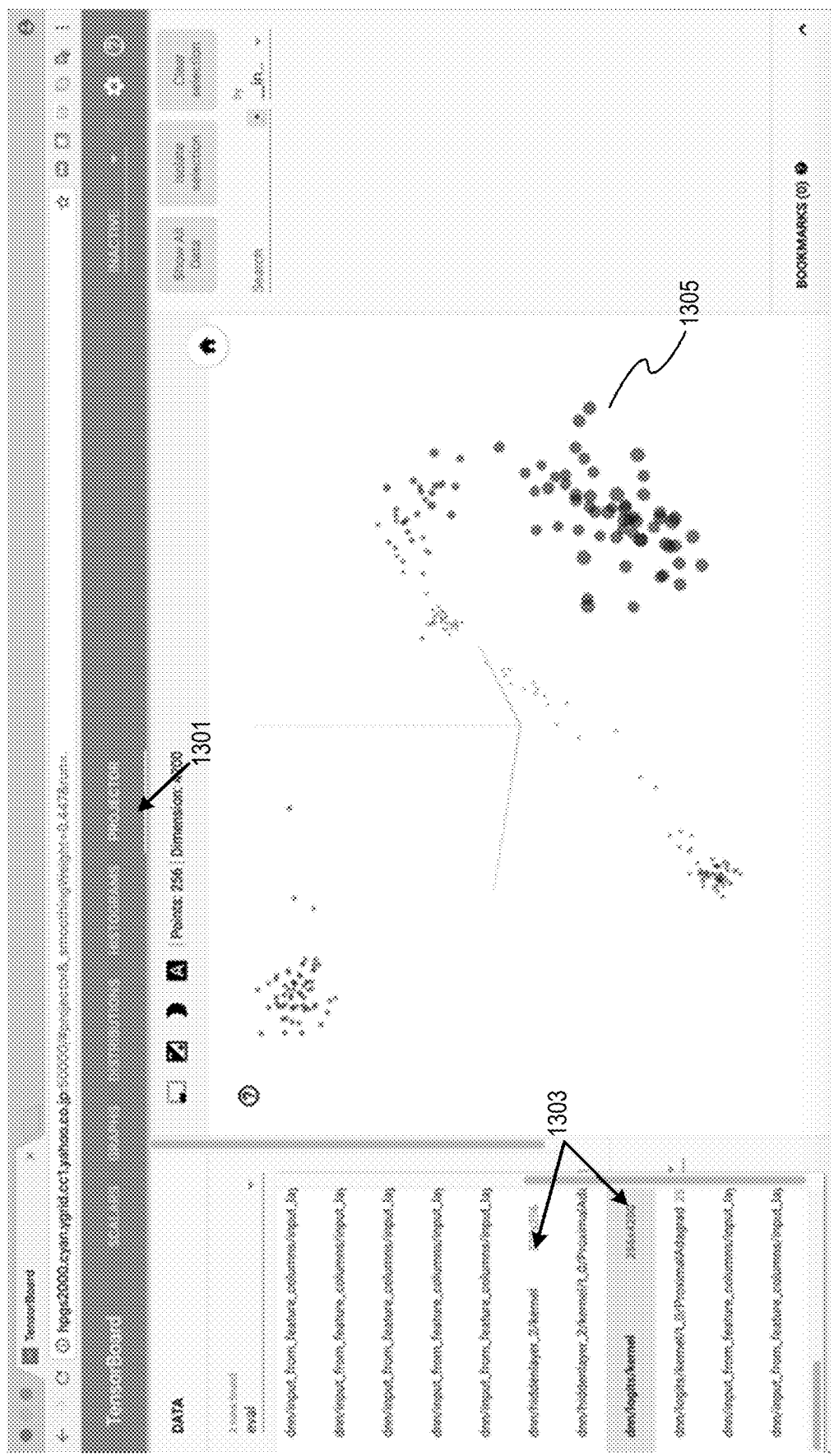
FIG. 13 illustrates another example implementation of a user experience.

FIG. 13 provides another example implementation of a user experience at 1300 more specifically, a user selects "projector" at 1301, and the user selects kernel at 1303. Accordingly, a data representation is shown at 1305.

The deep framework includes a model analyzer. More specifically, the model analyzer generates an export and accuracy report for each column associated with the input data. For example, but not by way of limitation, if the input data includes userid, operating system, agent address, and accuracy report will be generated for each of those columns. More specifically, a determination may be made as to whether a user has high accuracy or low accuracy for a given model, as well as the kind of data that may be necessary to improve the accuracy of the model, and the data that is in shortage.

According to one example implementation accuracy is determined for two models, for each of android and iOS. The output of the model analyzer provided an accuracy score between 0.0 and 1.0, for each of android and iOS, for each of the models. As could be seen, android was more accurate than iOS in both models. Further, a total data count is provided for both of the android and iOS inputs, to verify the amount of the data. Further, the output demonstrated that the second model had a high accuracy for both the android and iOS operating system.

Figure 14:
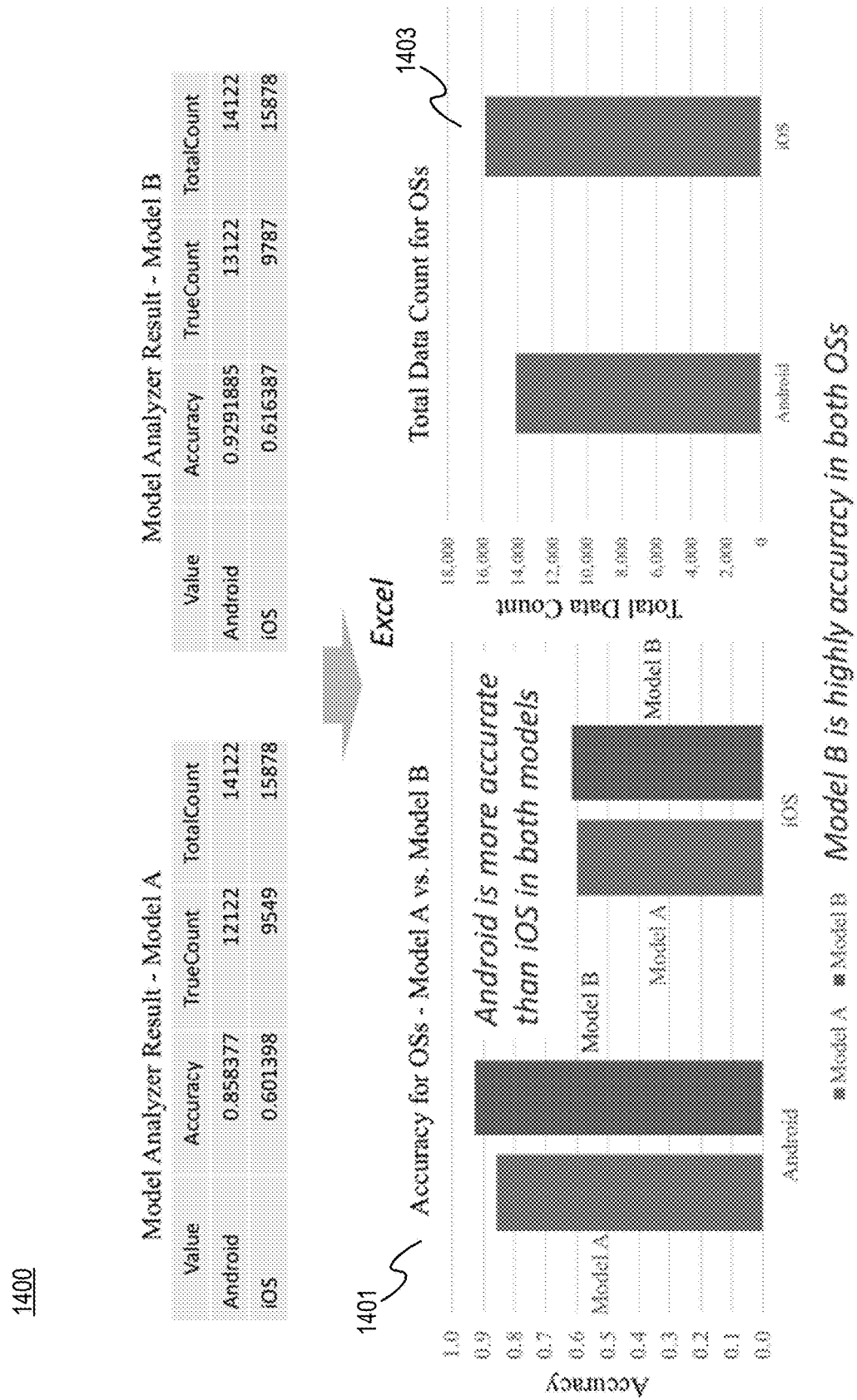
FIG. 14 illustrates a comparison between models for operating systems as data, executing the example implementation.

For example, as shown in FIG. 14, a comparison 1400 is provided between the models, for each of the android and iOS operating systems. As shown in 1401, for both model A and model B, android shows a higher accuracy, as compared with iOS. Further, between model A and model B, model B shows a greater accuracy as compared with model A. Additionally, 1403 shows data count for the operating systems.

User age was provided as the input for the model analyzer, and accuracy determination was made for each age group for each of the models. It could be seen that the second model provided high accuracy in most age groups. Further, a data count is provided for the age groups as well.

Figure 15:
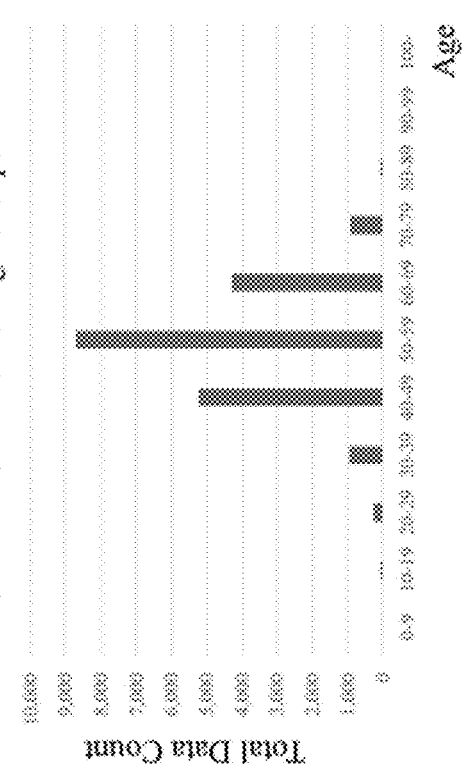
FIG. 15 illustrates a comparison between models for age groups as data, executing the example implementation.
Figure 15:
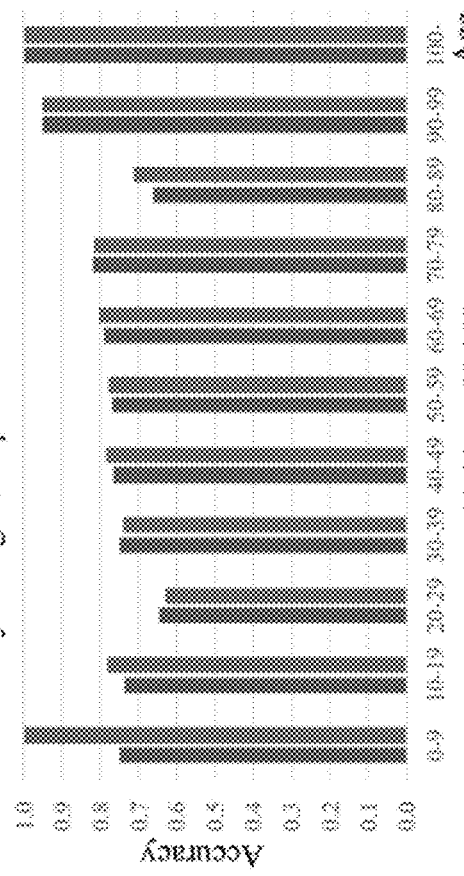

For example, as shown in FIG. 15, a comparison 1500 is provided across the age groups for each of model A and model B. As shown in 1501, model B has a higher accuracy for most age groups, as compared with model A. Additionally, 1503 shows data count for the age groups.

Figure 16:
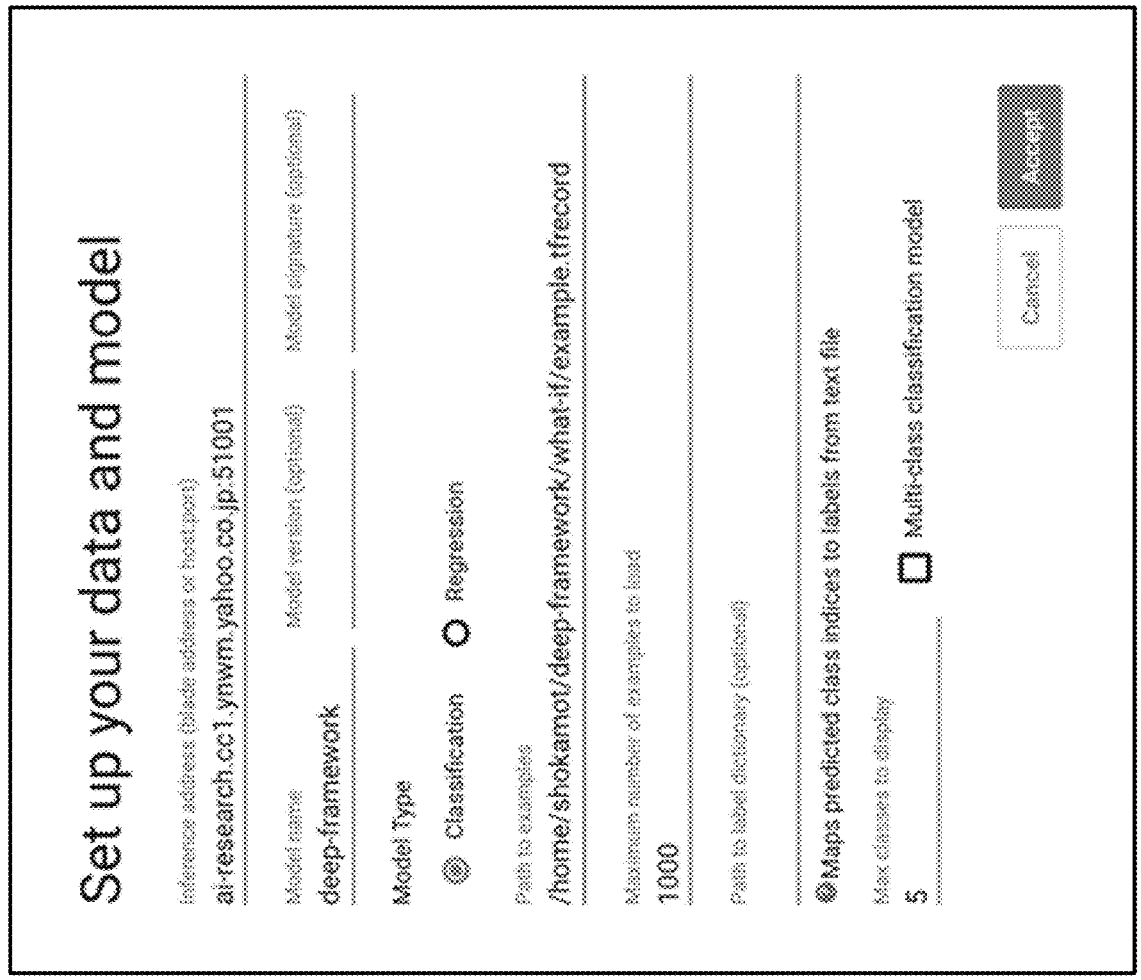
FIG. 16 illustrates an example user interface.
Figure 17:
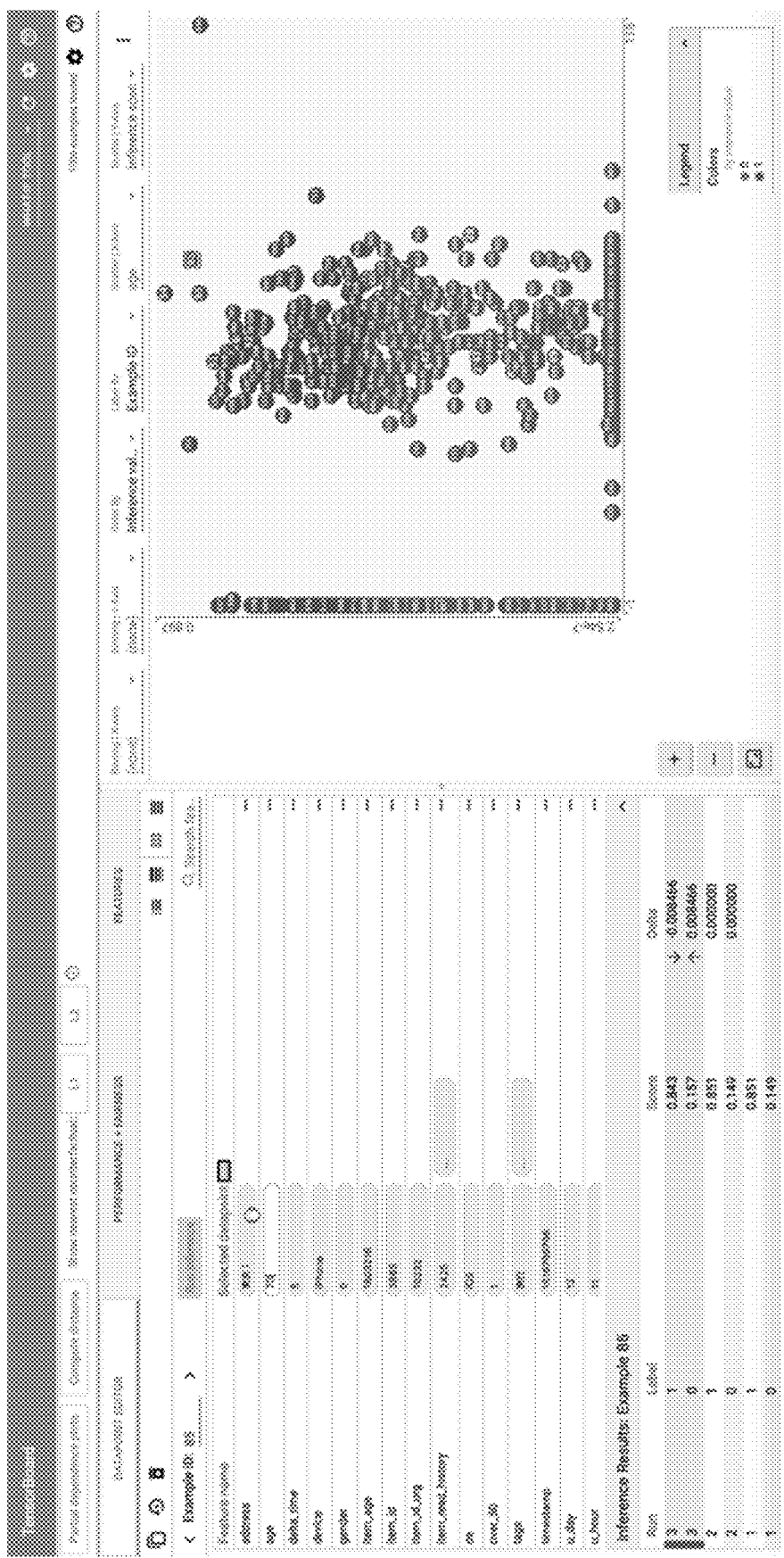
FIGS. 17-20 illustrate outputs of the example implementations.
Figure 18:
Figure 19:
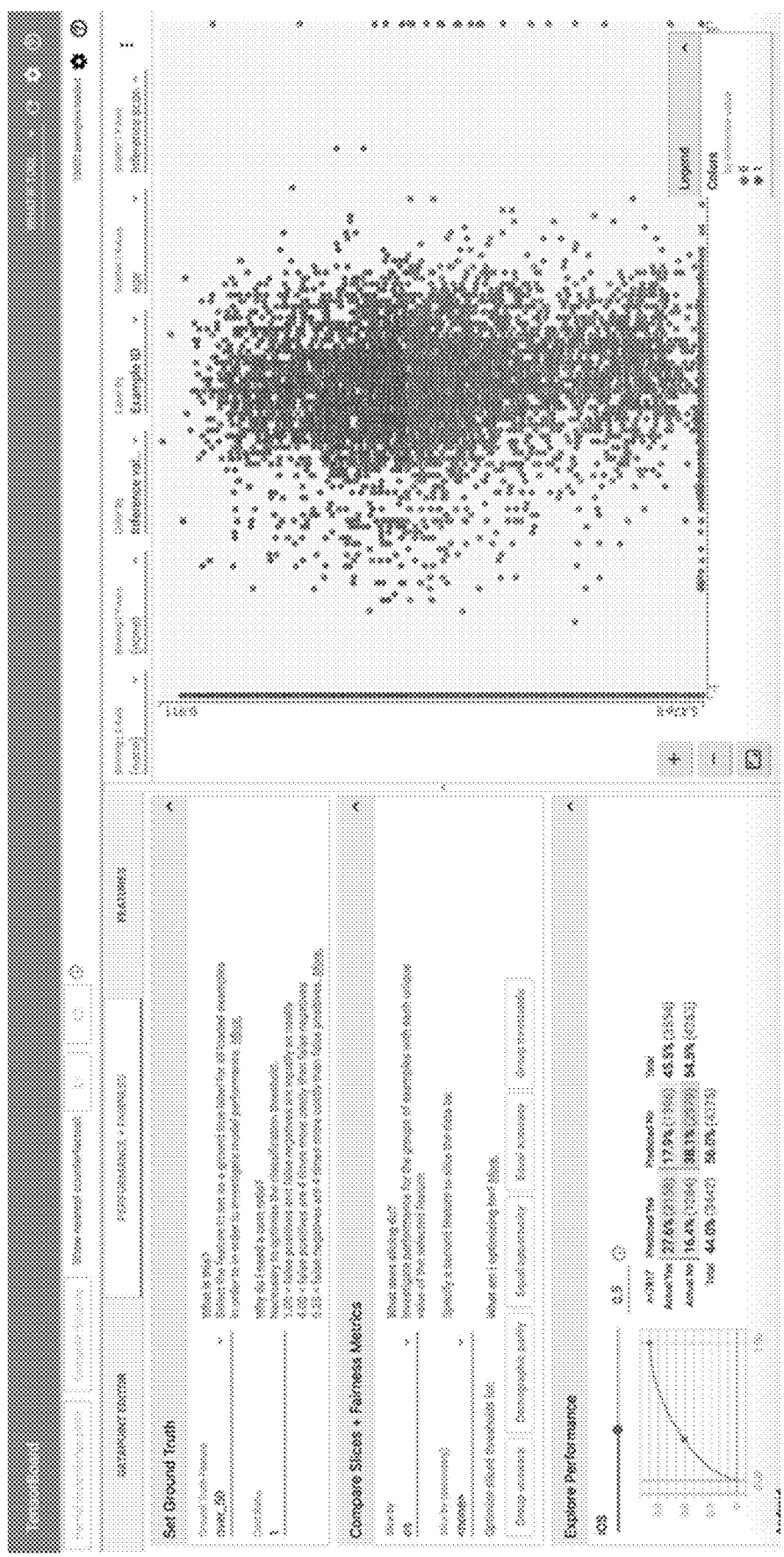
Figure 20:
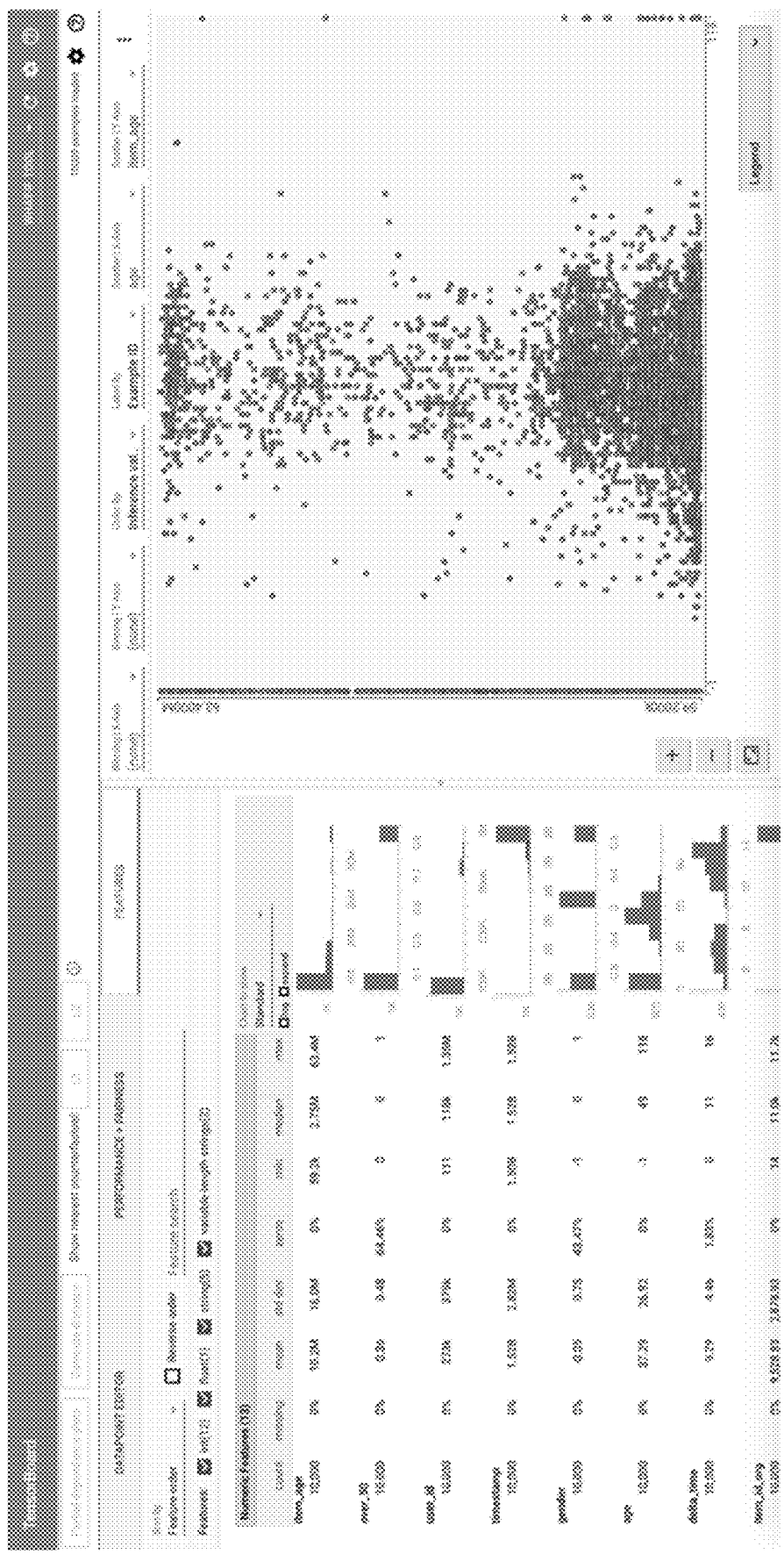

Additionally, the example implementations provide a tool, referred to as "what if" tool that permits inspection of the model in detail, without coding. When this tool is executed, data and model information may be entered, as well as a model type. For example, FIG. 16 illustrates such an example user interface 1600. When this information is entered, further outputs may be generated, such as to show data visually and provide a data point editor, to modify feature values and run an updated inference, and to set baselines for ground truth features compare fairness metrics, and otherwise review performance, as well as to visualize, for various input features, such as page, user ID, timestamp, etc. a display of the numeric features. For example, such outputs are shown in FIGS. 17-20.

In addition to the automatic tuning as explained below with respect to the tuner framework, a manual tuning option may be provided. More specifically, in some artificial intelligence models, the result of the tuner framework may not sufficiently meet customization requirements of a developer. In such situations, and optionally with requiring user consent, the model may be customized beyond the output of the tuner framework. Optionally, the manual tuning option may be disabled or not provided, so as to make the process fully automatic, and prevent manual access to potentially sensitive information. Additionally, a hybrid approach that combines some aspects of the automatic tuning described herein in the example implementations, and related art manual tuning approaches, may be provided.

Figure 21:
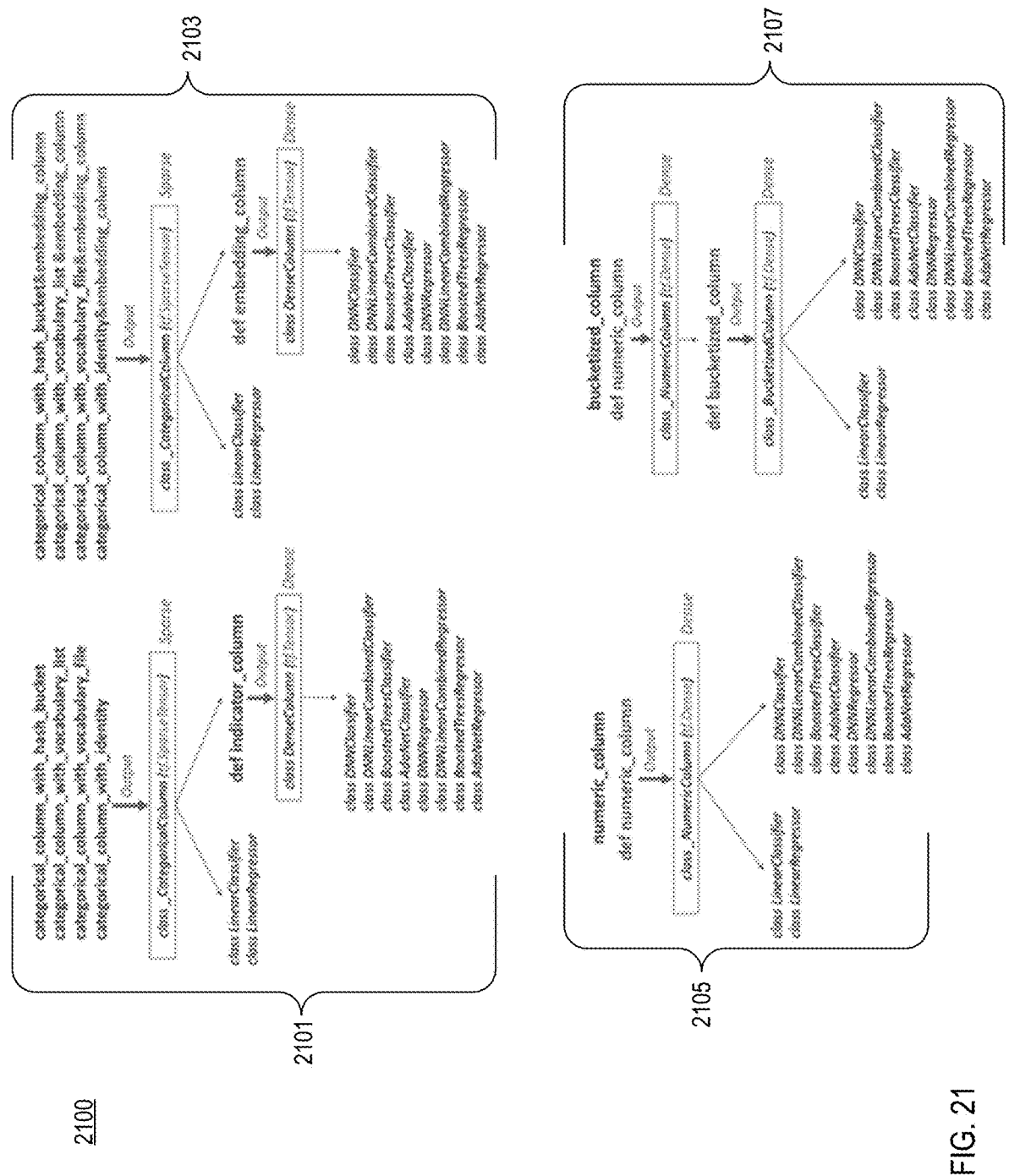
FIG. 21 illustrates an example implementation associated with feature function handling.

The foregoing example implementations of the deep framework may be executed on a sample data set. Further, multi-class classification, binary classification and regression may also be performed on one or more sample data sets. FIG. 21 illustrates an example implementation associated with feature function handling. More specifically, as shown in 2100, a plurality of scenarios associated with feature function execution, transformation function, and classification activity are shown. At 2101, the feature functions of categorical column with hash bucket, categorical column with vocabulary list, categorical column with vocabulary file, and categorical column with identity are executed to provide an output. A function is executed on the output, and based on a determination that the data is sparse, a linear classifier and a linear regressor may be executed. On the other hand, if the determination is that the data is dense, further classification functions may be executed as shown in 2101. Similarly, where embedding is performed, a scheme is shown in 2103. On the other hand, at 2105, where the feature function is numeric column, a determination is made as to whether the data is dense, and classifications are executed as shown therein. For bucketized columns, at 2107 numeric column is defined, a determination is is made that the data is dense, and various classifications are performed.

Figure 22:
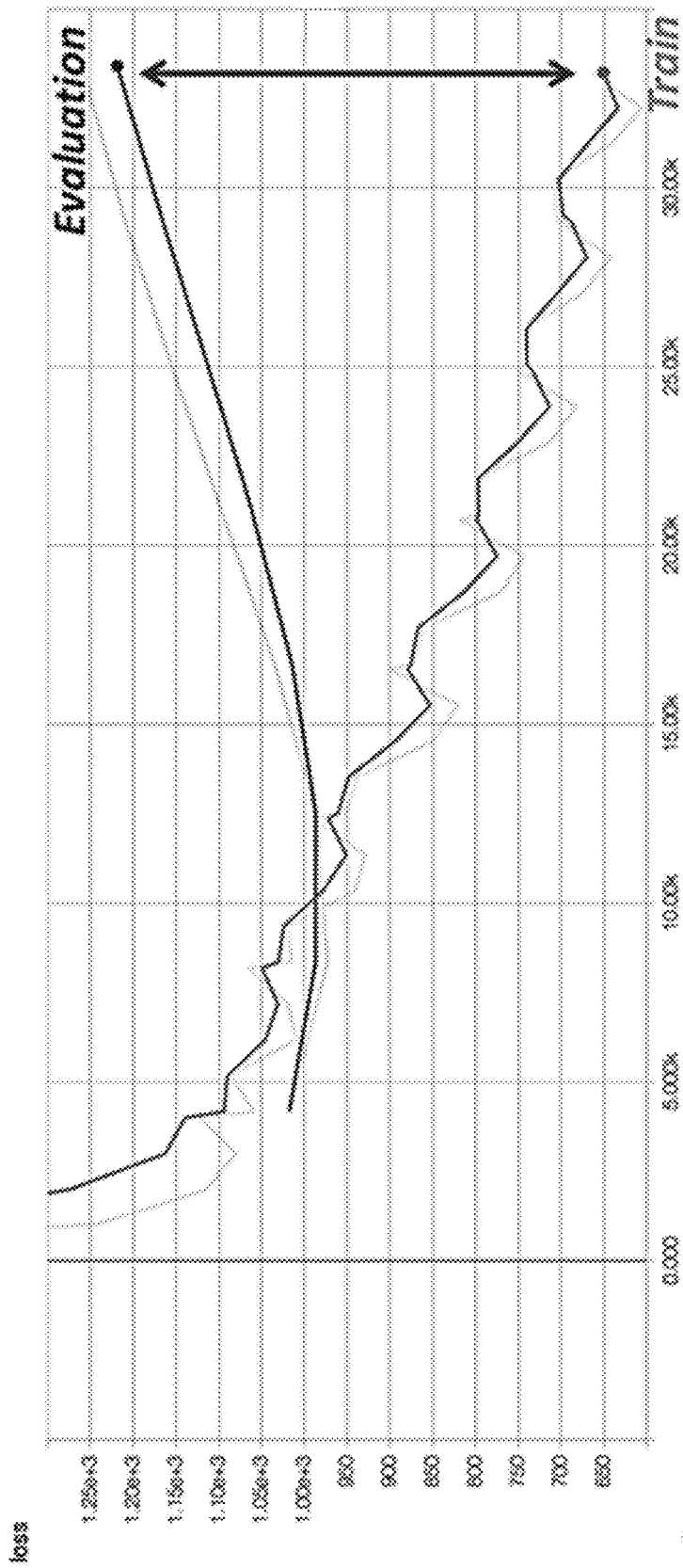
FIG. 22 illustrates situations an overfitting situation determined by the example implementation.

According to an example implementation, and over fitting scenario may be identified, where the loss of the evaluation data exceeds that of the training data. In such a situation, as shown in FIG. 22 (e.g., large different in loss between evaluation data and training data), a determination may be made to modify the configuration file, such as by requiring more data, regularization, or to provide a new model architecture.

Figure 23:
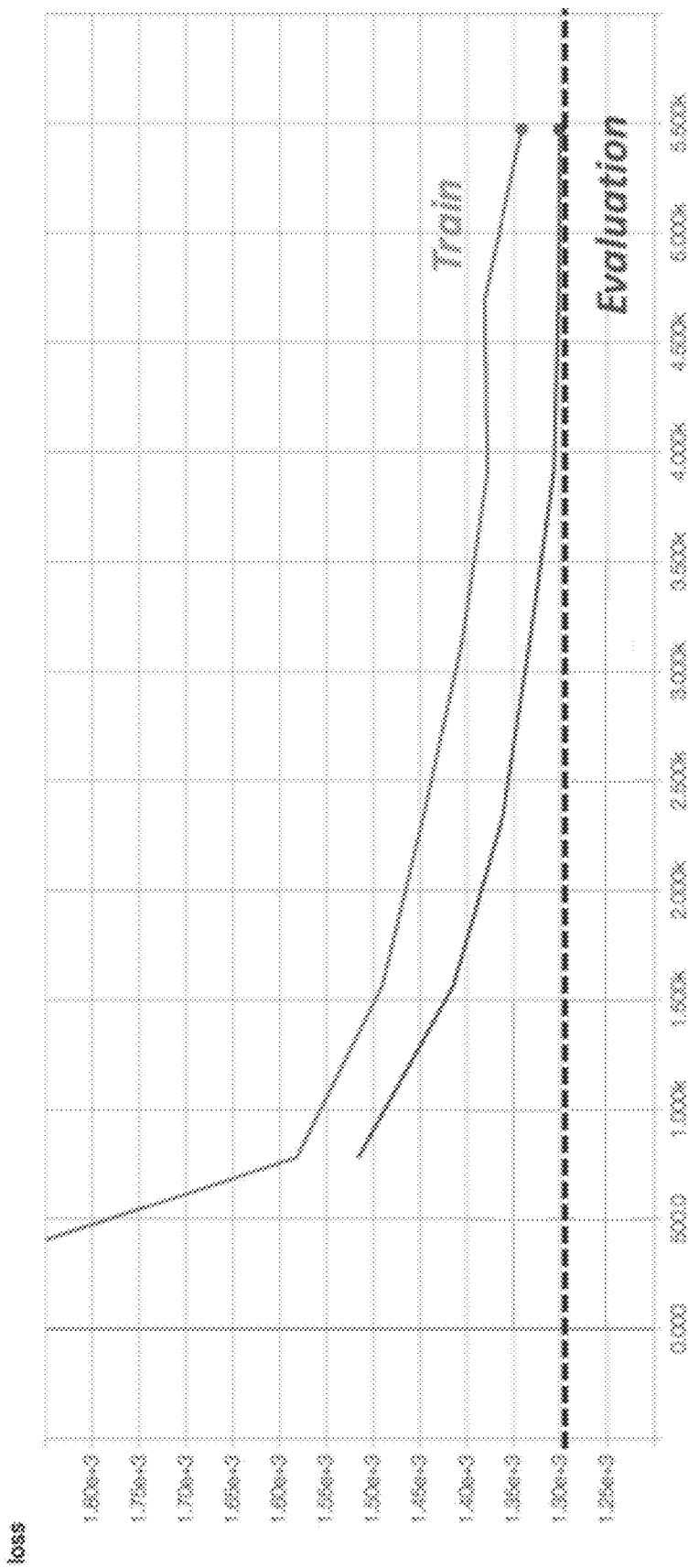
FIG. 23 illustrates situations an underfitting situation determined by the example implementation.

Alternatively, as shown in FIG. 23, in situations where the training and evaluation loss are high, there may be an under fitting situation. In this situation, the configuration file may be modified, such as to provide a bigger model, train for a longer time period, or adopt a new model architecture.

According to the example implementations, the deep framework exports statistical information associated with the data, based on results of the feature function as well as the data type, to manipulate the data, and provide a recommendation for optimal selection.

Thus, the example implementations provided herein, using the deep framework, allow for automatic selection of the features, using density with respect to range. For example but not by way of limitation, whether data density is sparse, contiguous, dense, etc. is taken into consideration for various data types. For sparse data with a large sample size, embedding may be performed. Further, for contiguous, or very dense data, a determination may be made to check how much data is present, and depending on whether a threshold has been met, embedding is performed. If such a threshold has not been met or a lower threshold is provided, data may be categorized with identity.

If the data is not dense enough, it may not be possible to categorize; moreover, when the data is sparse, hashing may be performed to avoid showing identity. Using this embedding model, the example implementation determines whether the threshold has been met. Thus, optimization of a model may be provided, and as explained with respect to the tuner framework, the model selection may be performed either randomly or based on Bayesian optimization, for example.

Figure 24:
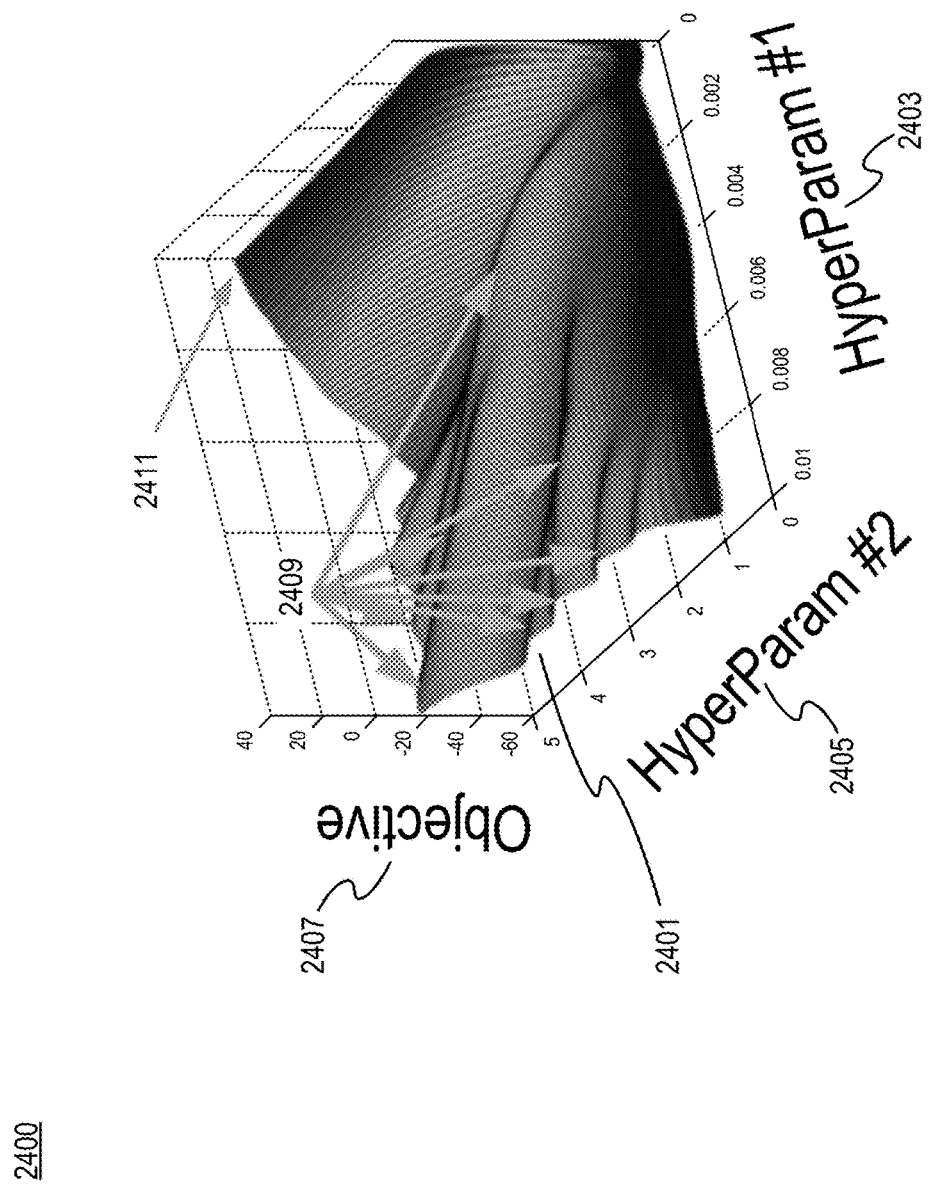
FIG. 24 illustrates a solution space with local results and a global maximum result.

As also explained above, a tuner framework is provided, to optimize hyper parameter, the combination of input data, and model selection automatically. In some circumstances, optimal values of the model cannot be obtained manually. For example, as shown in FIG. 24 at 2400, in a solution space 2401 between a first hyperparameter 2403 and second hyperparameter 2405 and an objective 2407, manual optimization may provide local results 2409. However, the globally maximum result 2411 may not be obtained by mere manual optimization efforts. Further, manual optimization efforts may permit operators to view user and/or item data in a non-privacy preserving manner.

Figure 25:
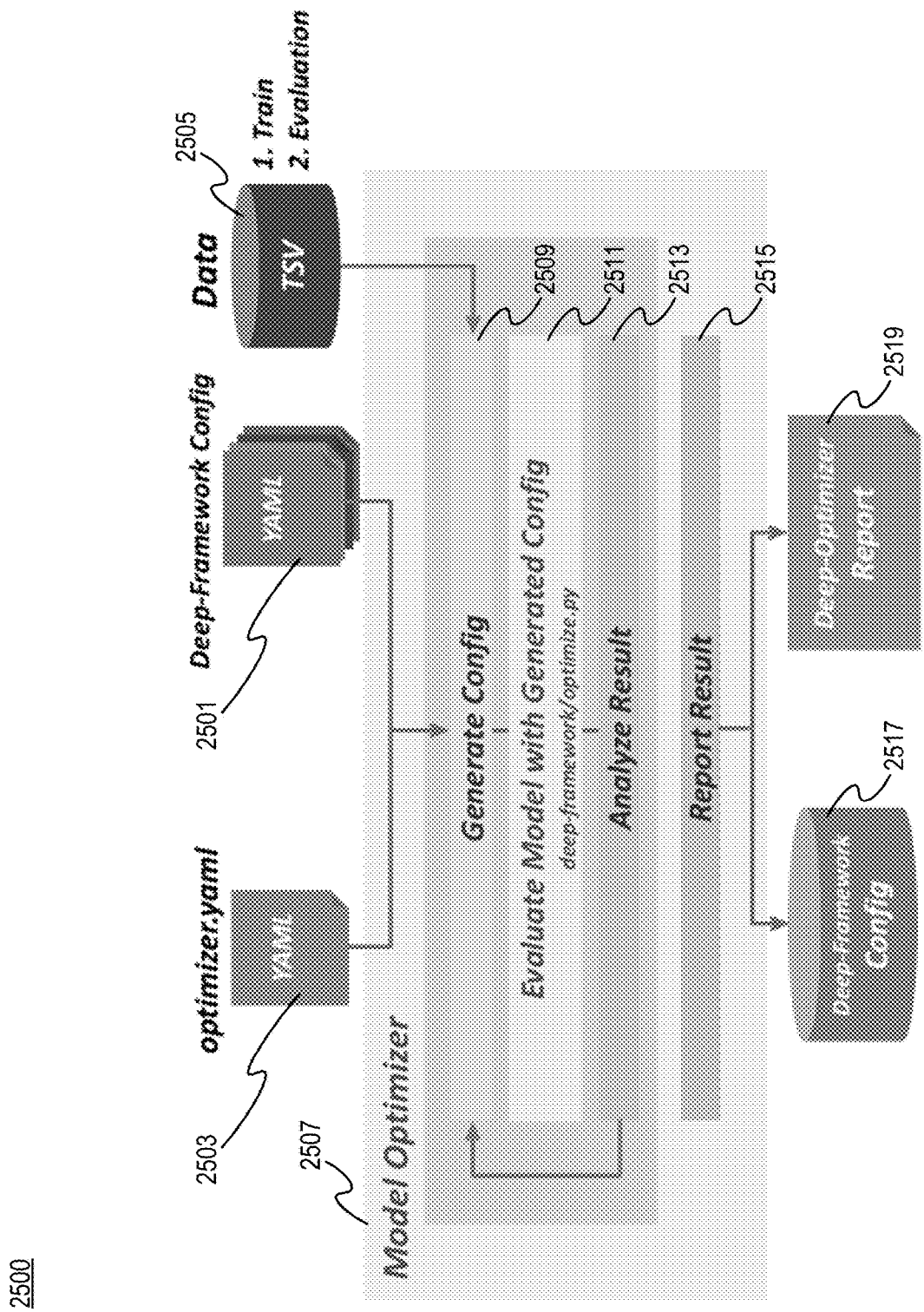
FIG. 25 illustrates the tuner framework according to an example implementation.

Accordingly, the present example implementations provide a random search algorithm and a Bayesian optimization algorithm, and are provided within the context of the deep framework and the data framework. More specifically, as and shown in FIG. 25, the tuner framework 2500 includes the deep framework configuration file 2501 as well as an optimizer file 2503, and the input data 2505, for example in TSV format as explained above.

More specifically the model optimizer 2507 receives the generated configuration file 2509, performs an evaluation of the model with the generated configuration file using the optimizer at 2511, analyzes the result at 2513, and provides a report output at 2515, to the deep framework configuration 2517 as well as in a report form 2519.

As explained above, a configuration file is generated by the data framework, and may be provided directly to the tuner framework, with or without editing. In the configuration file, metrictag is specified, as average_loss (MINIMIZE) for the regressor model, and accuracy (MAXIMIZE) for the classifier model. Further, the algorithm, either random search or Bayesian optimization must be specified, as well as an allowable maximum number of model parameters.

Figure 26:
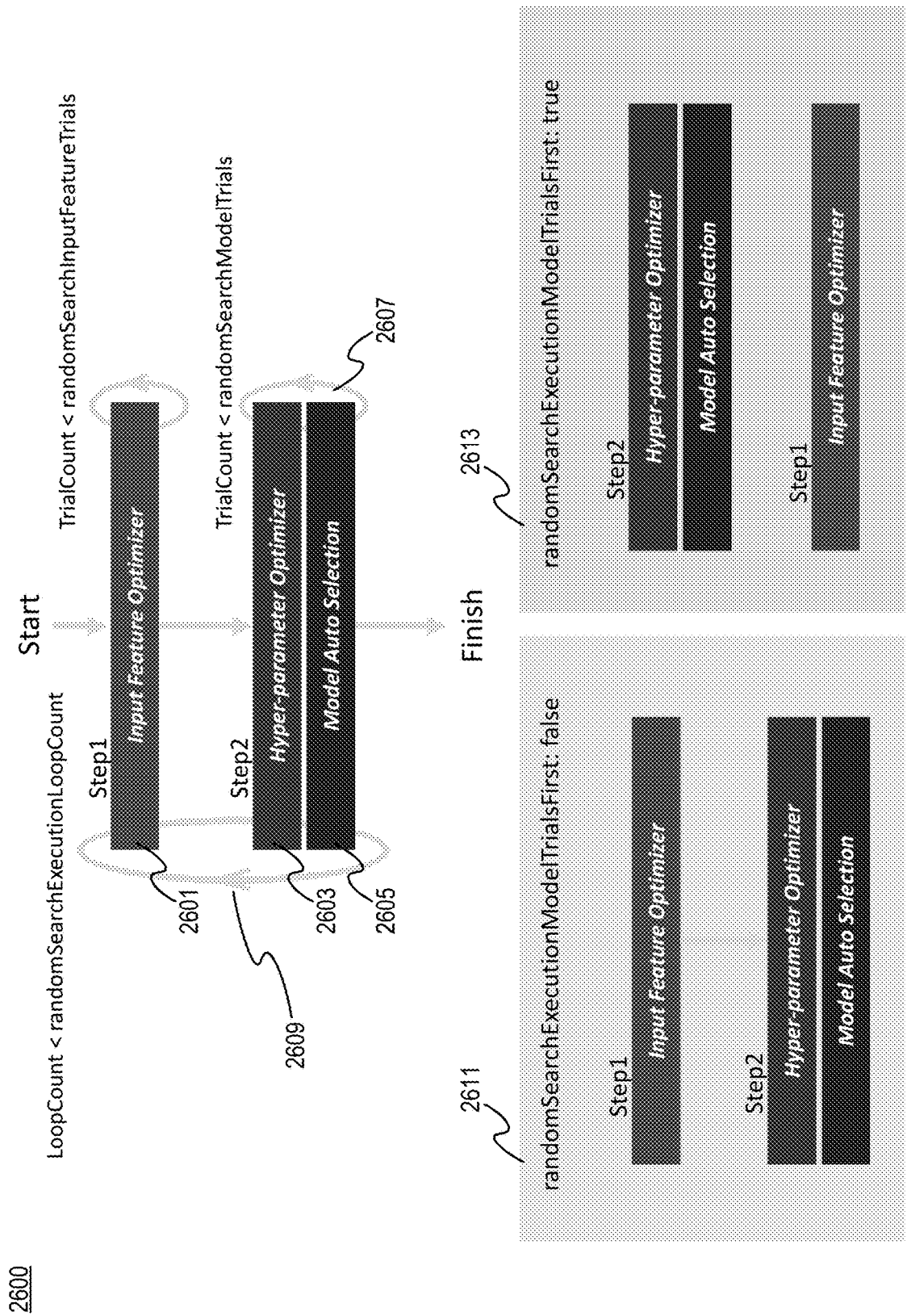
FIG. 26 illustrates an algorithm according to the example implementation.

According to the example implementation, the random search algorithm may be performed as follows, as shown in FIG. 26 at 2600. In a first operation 2601, the input feature is optimized, and this operation is performed iteratively so long as the count of the trial is less than the number of input feature trials. In a second operation 2607, hyper parameter optimization 2603 and model auto selection 2605 are performed. These operations are performed so long as the count of the trial is less than the number of model trials. The first and second operations are performed in a loop at 2609, so long as the count of the loop is less than the loop count required to execute the random search.

Once the random search execution model has been executed, if the result is "false", the first operation is performed before the second operation as shown in 2611. On the other hand, if the result is "true", the operations are reversed, and the second operation is performed before the first operation as shown in 2613.

With respect to the first operation, which is the setting of input feature operation, so as to automatically extract the optimal combination of input features, the example implementations are performed as follows. Once a trial number has been testified, and optimization is enabled by setting the feature column function type to "true" so as to generate the feature functions as explained above, a determination is made as to whether a function of performing the random search input feature based on best results is set to "true". If this is the case, genetic algorithms are used to optimize combinations of input functions. Optionally, a list of input features to be used at each operation during optimization processing may be provided, as well as a number of iterations per trial, and a number of results inherited for the next hyper parameter optimization process. As a result, automatic optimization of the input features is performed.

With respect to the second operation, a hyper parameter optimization is provided. For example, values of certain parameters may be optimized, based on a setting of a trial number, and the algorithm being set to "Bayesian optimization". Further, a number of trials and iterations may also be set. Then, the model optimizer configuration file is checked, and edited if necessary. The prior results of the tuner framework are cleared, followed by the execution of the tuner framework with the data set, using the configuration file and the data provided by the data framework.

The tuner framework may be executed on a single device on a single machine, CPU or GPU, or on multiple devices in a single machine, with GPU being automatically used over CPU. Processing of the tuner framework is executed in the background.

With multiple devices on a machine, a number of CPUs or GPU's to parallelize may be provided. Further, the tuner framework may be run on multiple devices on multiple machines; optionally the tuner framework may select to use GPU automatically over CPU on a given machine or machines generally. More specifically, the execution of the tuner framework will modify the server list file, and execute the tuner framework with multiple devices on multiple machines.

As explained herein, the tuner framework automatically tunes and creates the artificial intelligence model. Using the deep framework as a library, and based on the execution of the deep framework, the tuner framework provides an updated model, or recommended changes to a model. Optionally, a user may be provided with a report, that includes an indication of the erroneous, missing or otherwise improper data that needs to be changed, and provides the user with an opportunity to change such data. Using this option, and providing an opportunity to give feedback, the model may be further refined, and performance may be further improved, by removing data that should not be included in the deep framework and the tuner framework.

The example implementations described herein include the input optimizer as well as the hyper parameter optimizer, which are implemented in the tuner framework to provide a determination of an optimal model. The input optimizer provides optimization in response to raw data provided by a user, and determining an optimal combination of the provided raw data.

According to the example implementations, the optimizer in the tuner framework provides for input optimization. In contrast, related art approaches do not provide permit input optimization. Instead, related art approaches attempt to gather all information into the model, and include all data, but do not provide for input optimization after the data has been split. Instead, the related art approach seeks to maximize input data. However, in the example implementation, the tuner framework determines and selects an optimal combination of features, such that the critical information and parameters are selected, and the noise is removed. For example, the genetic algorithm described herein may be employed to optimize input. Further, as also explained herein one or more of a random model and a Bayesian model are employed for hyper parameter optimization.

Additionally, the example implementation provides an iterative approach. As explained herein, an iterative approach is provided with respect to input optimization, and independently, an iterative approach is also provided with respect to hyper parameter optimization. Further, the input optimization and hyper parameter optimization are included in an iterative loop. The inventor has determined that by adding in the iterative loop of the input optimization and hyper parameter optimization, some critical and unexpected results may be provided.

Once the tuner framework execution has been completed, the progress result is confirmed. More specifically, the results of a prescribed top number may be provided in real time, or based on a stopping point, such that the ranked results can be reviewed. Alternatively, all results may be displayed, using a display tool, such as TensorBoard, to show, for example accuracy or average loss.

The final result may be confirmed, and the result log may be exported, with input feature information. The final result may be used to train the model, using the best result, and thus, the configuration file may be modified, and the training run again.

Figure 27:
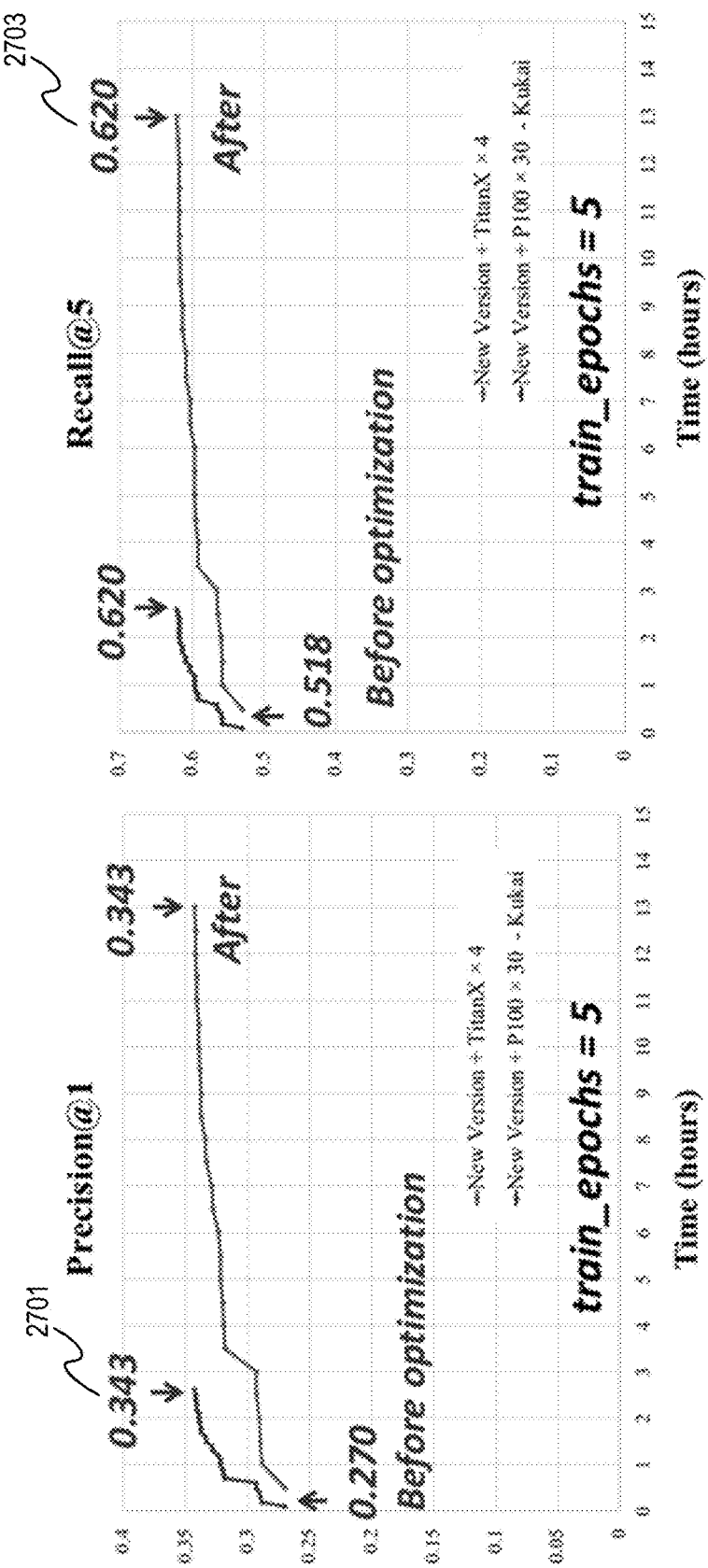
FIGS. 27-29 illustrate results associated with an operation of the example implementations.

According to an example, and as shown in FIG. 27, the model optimizer may be run on data associated with "map life magazine", and a problem type of multi-classification. As can be seen at 2701 and 2703, precision and recall are respectively each increased before and after optimization, using two different processing models. Further, the features, as well as the model, can be seen as being optimized, before and after optimization.

Figure 28:
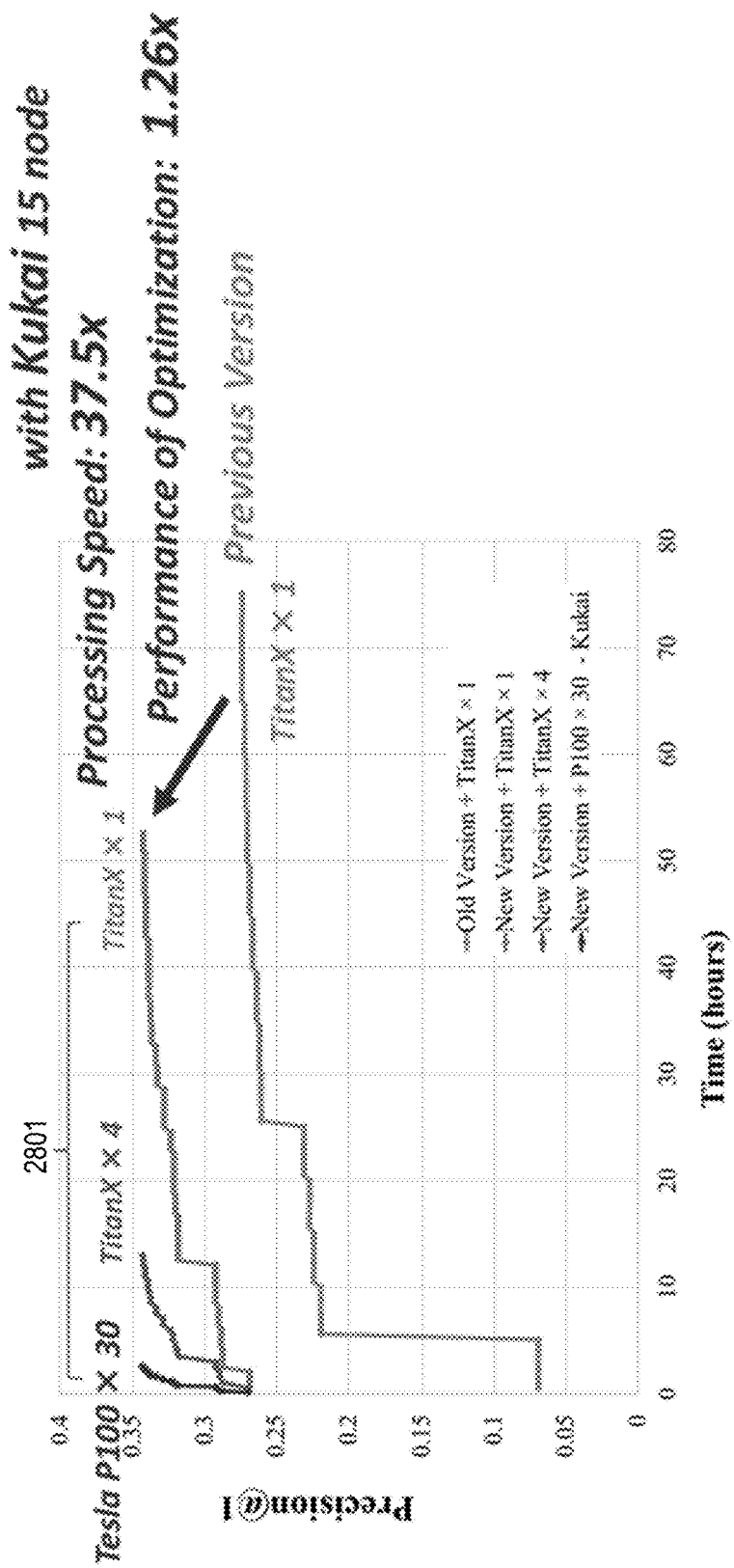
Figure 29:
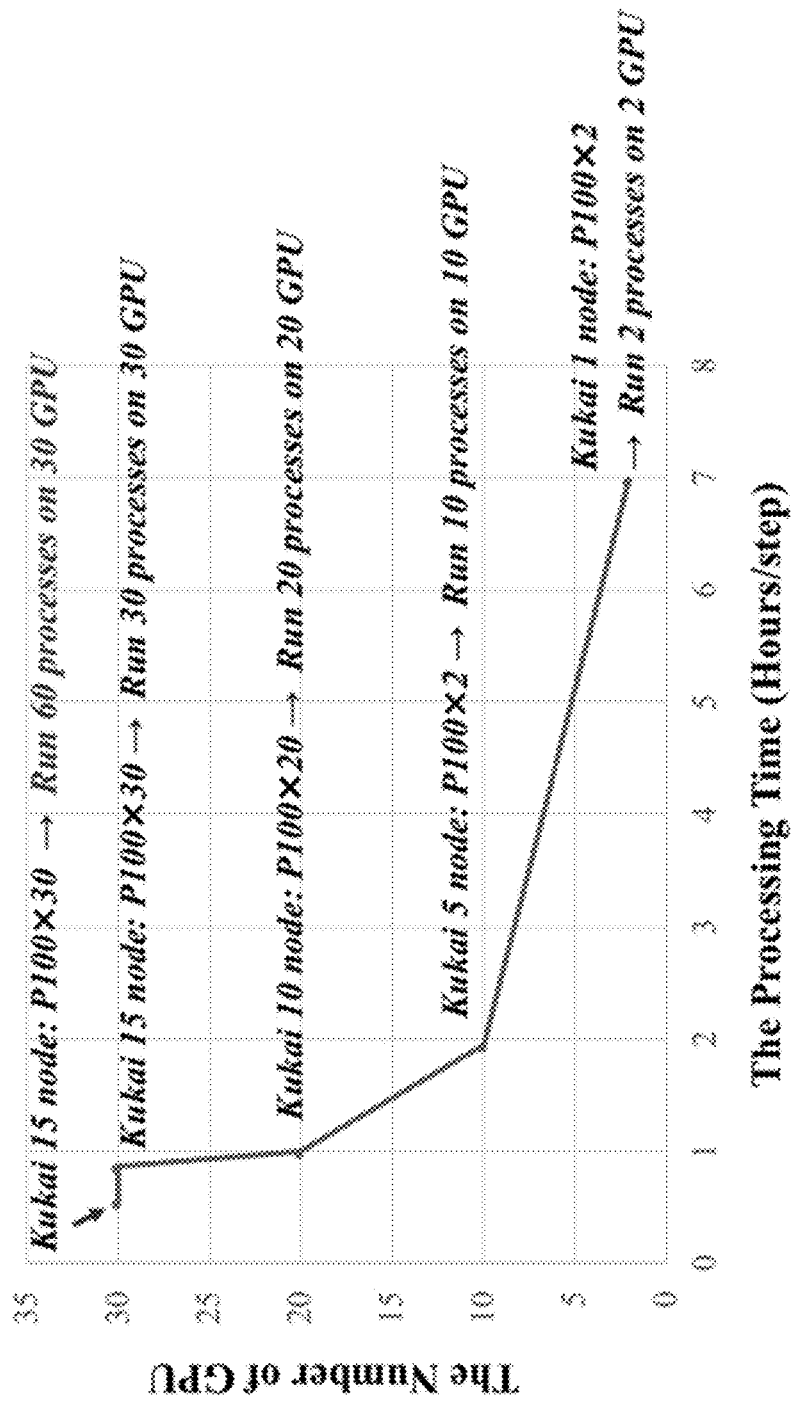

As shown in FIG. 28, using an alternate hardware configuration at 2801, processing speed is also substantially increased, as can be shown in the number of hours required to calculate precision. For this new version, as shown in FIG. 29, the performance of parallel distributed processing can also be shown to have a substantially increased performance in terms of processing time.

Accordingly, an output may be provided based on the probability or likelihood. In the example implementation of a user engaged in online searching, such as searching for a product or service to purchase, the search results may be ranked or ordered based on a probability of an item being purchased by the user. Because the foregoing example implementation may automatically provide the service, operators may not be required to manually review information associated with a user. Thus, the present example implementations may provide a privacy preserving approach to use of artificial intelligence techniques to provide ranked outputs in online searching, for example.

For example, according to one electronic commerce model, the input data is user information, including user ID, demographic information, operating system, device used for search, etc. Further, the input data also includes item information such as item ID, title, type, metadata, category, publishing date, provider, company name, etc. the foregoing data may be used as inputs into the data framework, deep network and tuner framework. The output of the model is a probability of an event associated with the user and the item, such as a purchase, occurring. As explained above, embedding is used to vectorize the data, and assess a similarity between the data.

Moreover, the forgoing example implementations also provide candidate features. For example, but not by way of limitation, export candidate and function types may be provided, along with statistics and candidate features, in an automatic manner. The best results of the best functions for the model are provided, to generate parameters and inputs for use. The example implementations may receive the base model, and extract information from the log, such as model size, metrics and average loss. As a result, a user may understand the optimal model, based on the information provided by data framework, deep framework and tuner framework.

Thus, the model can be used to predict a likelihood of a purchase of an item by a user, for example, and based on the ranking of such a likelihood, provide a list of items or recommendation in a prioritized border to a user requesting a search. Alternatively, for a given item, a ranking may be provided of users that may be likely to purchase that item, for the vendor of that item. For example, for a website that offers a variety of products, sorted by category optionally, the present example implementation may provide a sorted, ranked output to the user of the items based on a likelihood of purchase, or a ranked output to a vendor of the users based on a likelihood of the user purchasing the item. Accordingly, the recommendation is automatically personalized to the user performing the search. The model automatically learns the user preferences and the user characteristics, and applies this learned information to calculate the likelihood of the user purchasing one or more of the items.

Additionally, the example implementations provide at least one or more benefits for advantages related to preservation of privacy. For example, but not by way of limitation, the example implementation may be executed such that the data is provided, process and output without any person being required to access, review or analyze the data. Further, the example implementations may also provide a restriction such that no user or person is permitted to access the data throughout the process.

Optionally, further security may be provided for the user data, by anonymization, pseudo-anonymization, hashing or other privacy preserving techniques, in combination with the example implementations. To the extent that outside access to the model is required, such access is only permitted by way of the APIs as discussed above; in such a situation the user and for the service can only access the final result, and cannot access privacy related information associated with the data.

While the data may be considered to be any data as would be understood by those skilled in the art, according to one example implementation, the data may comprise user behavior data. For example, but not by way of limitation, the user behavior data may include information on user demographic, which may be combined with other data that is input into the data framework.

More specifically, with respect to the artificial intelligence model, and in particular the deep framework, training and inference may be performed to generate the prediction. The foregoing example implementations are directed to the inference being used to generate a prediction of user behavior with respect to a product, in response to the results of the training as explained above.

Figure 30:
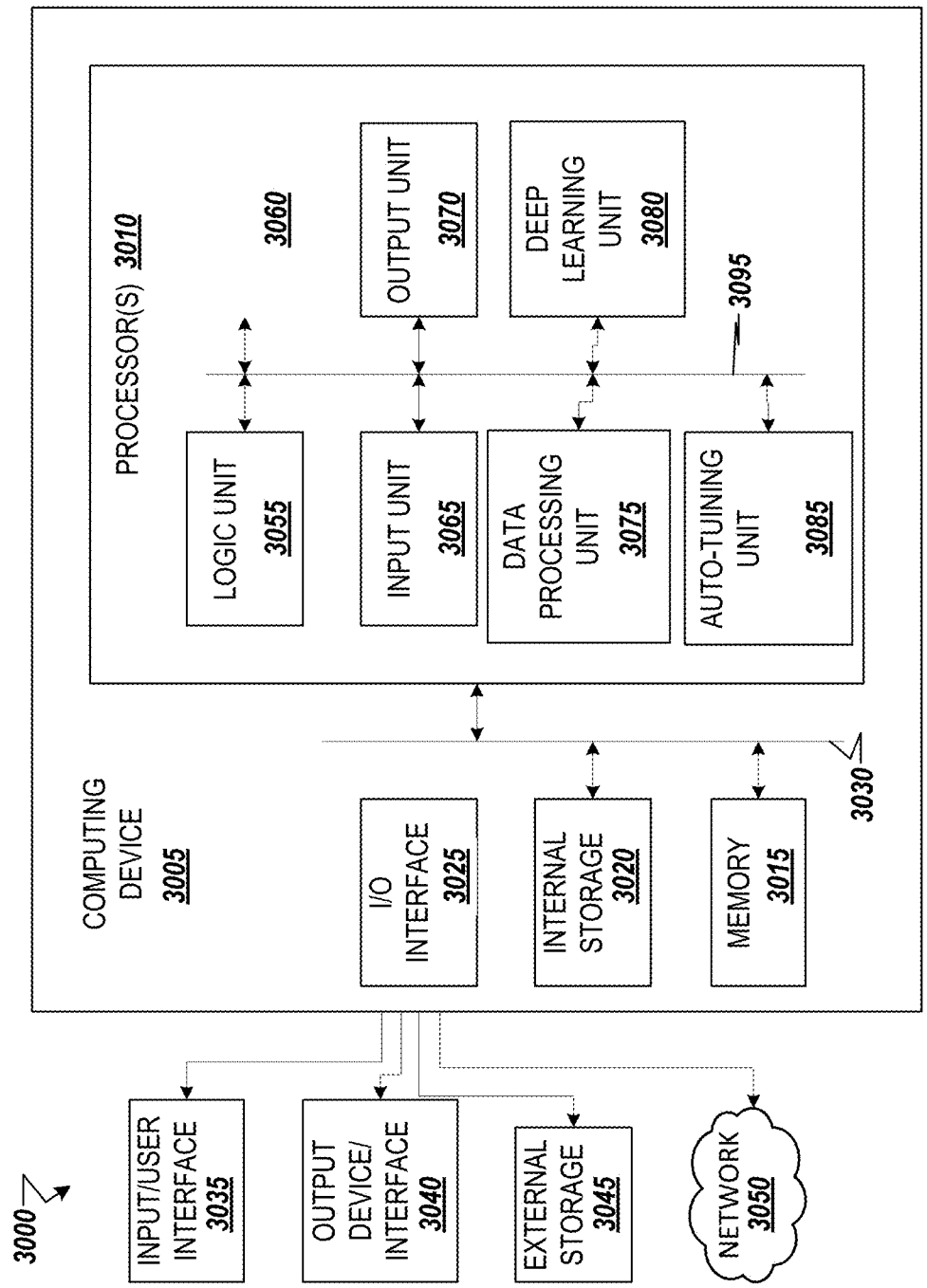
FIG. 30 illustrates an example computing environment with an example computer device suitable for use in some example implementations.

FIG. 30 illustrates an example computing environment 3000 with an example computer device 3005 suitable for use in some example implementations. Computing device 3005 in computing environment 3000 can include one or more processing units, cores, or processors 3010, memory 3015 (e.g., RAM, ROM, and/or the like), internal storage 3020 (e.g., magnetic, optical, solid state storage, and/or organic), and/or I/O interface 3025, any of which can be coupled on a communication mechanism or bus 3030 for communicating information or embedded in the computing device 3005.

Computing device 3005 can be communicatively coupled to input/interface 3035 and output device/interface 3040. Either one or both of input/interface 3035 and output device/interface 3040 can be a wired or wireless interface and can be detachable. Input/interface 3035 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 3040 may include a display, television, monitor, printer, speaker, braille, or the like. In some example implementations, input/interface 3035 (e.g., user interface) and output device/interface 3040 can be embedded with, or physically coupled to, the computing device 3005. In other example implementations, other computing devices may function as, or provide the functions of, an input/interface 3035 and output device/interface 3040 for a computing device 3005.

Examples of computing device 3005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 3005 can be communicatively coupled (e.g., via I/O interface 3025) to external storage 3045 and network 3050 for communicating with any number of networked components, devices, and systems, including one or more computing devices of the same or different configuration. Computing device 3005 or any connected computing device can be functioning as, providing services of, or referred to as, a server, client, thin server, general machine, special-purpose machine, or another label. For example but not by way of limitation, network 3050 may include the blockchain network, and/or the cloud.

I/O interface 3025 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and networks in computing environment 3000. Network 3050 can be any network or combination of networks (e.g., the Internet, local area network, wide area network, a telephonic network, a cellular network, satellite network, and the like).

Computing device 3005 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 3005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 3010 can execute under any operating system (OS) (not shown), in a native or virtual environment. One or more applications can be deployed that include logic unit 3055, application programming interface (API) unit 3060, input unit 3065, output unit 3070, data processing unit 3075, deep learning modeling unit 3080, automatic tuning unit 3085, and inter-unit communication mechanism 3095 for the different units to communicate with each other, with the OS, and with other applications (not shown).

For example, the data processing unit 3075, the deep learning modeling unit 3080, and the automatic tuning unit 3085 may implement one or more processes shown above with respect to the structures described above. The described units and elements can be varied in design, function, configuration, or implementation and are not limited to the descriptions provided.

In some example implementations, when information or an execution instruction is received by API unit 3060, it may be communicated to one or more other units (e.g., logic unit 3055, input unit 3065, data processing unit 3075, deep learning modeling unit 3080, and automatic tuning unit 3085).

For example, the data processing unit 3075 may receive and process input information, perform data analysis, transformation and validation, and split the data. An output of the data processing unit 3075 may provide a configuration file as well as data that has been split for testing, evaluation, training and the like, which is provided to the deep learning modeling unit 3080, which performs training to build a model, and validate the model, as well as performing at scale training, followed by the eventual serving of the actual model. Additionally, the automatic tuning unit 3085 may provide automatic optimization of input and hyper-parameters, based on the information obtained from the data processing unit 3075 and the deep learning modeling unit 3080.

In some instances, the logic unit 3055 may be configured to control the information flow among the units and direct the services provided by API unit 3060, input unit 3065, data processing unit 3075, deep learning modeling unit 3080, and automatic tuning unit 3085 in some example implementations described above. For example, the flow of one or more processes or implementations may be controlled by logic unit 3055 alone or in conjunction with API unit 3060.

Figure 31:
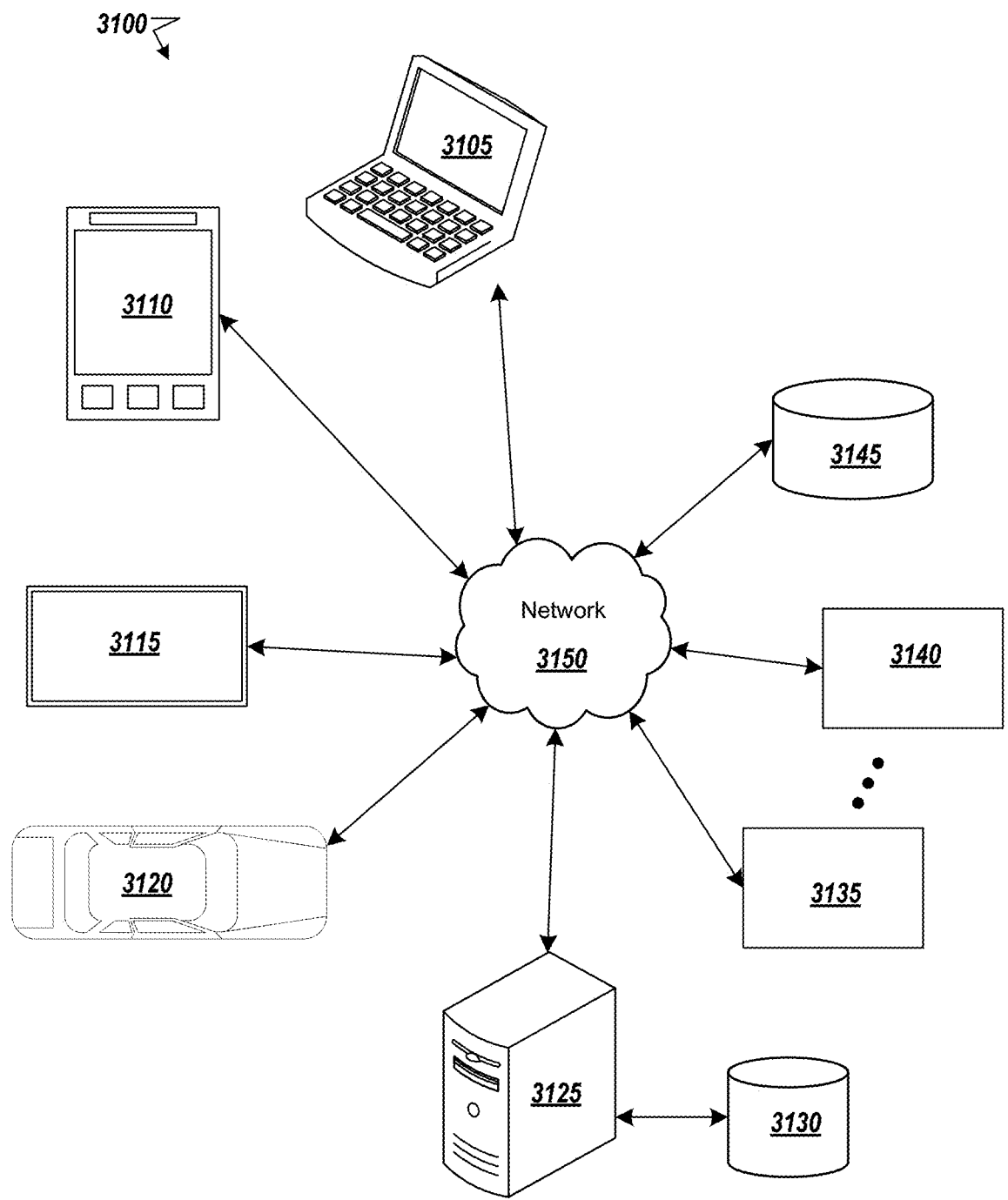
FIG. 31 shows an example environment suitable for some example implementations.

FIG. 31 shows an example environment suitable for some example implementations. Environment 3100 includes devices 3105-3145, and each is communicatively connected to at least one other device via, for example, network 3160 (e.g., by wired and/or wireless connections). Some devices may be communicatively connected to one or more storage devices 3130 and 3145.

An example of one or more devices 3105-3145 may be computing device 3005 described in FIG. 30, respectively. Devices 3105-3145 may include, but are not limited to, a computer 3105 (e.g., a laptop computing device) having a monitor and an associated webcam, a mobile device 3110 (e.g., smartphone or tablet), a television 3115, a device associated with a vehicle 3120, a server computer 3125, computing devices 3135-3140, storage devices 3130 and 3145.

In some implementations, devices 3105-3120 may be considered user devices associated with the users who may be remotely receiving a broadcast, and providing the user with settings and an interface. Devices 3125-3145 may be devices associated with service providers (e.g., used to store and process information associated with the document template, third party applications, or the like).

The foregoing example implementations may provide various benefits and advantages to various entities.

In the example implementation, and end-user may provide information to a service. In turn, the service may provide a recommendation to a user. In related art approaches, because of the manual involvement of computer programmers, data analyst, etc., private information of the user may be exposed to those entities, to perform model optimization. However, as explained herein, the example implementations provide for an automated approach that does not require the involvement of such intermediaries or entities. Thus, the personal, private information of the user may be restricted from other users, developers or others. Accordingly, there is a privacy preserving benefit to the example implementations.

Additionally, a vendor that employs the present example implementations may not be required to provide sensitive or private data of its customers to a platform, in order to realize the benefits of such artificial intelligence approaches. Instead, using the automated approaches described herein, a vendor, such as a service provider, may be able to protect the privacy of the user, while at the same time obtaining optimized model information. Further, if the input optimization provides a determination that less data is required, the privacy of the end-user is further protected.

Similarly, a platform or developer may also realize various benefits and advantages. For example, but not by way of limitation, the model may be optimized without requiring additional manual coding or input of information; the requirements placed on the platform or the developer may be limited to selecting options to be implemented. If the developer requires review and revision of the model manually, and wishes to understand the parameters and change input data, with the permission of the user, the above described whatif tool permits the user to take such an approach. For example, with the permission of the user, the developer may change input data, and be able to more easily obtain a result, wherein the input data is changed based on the tuner framework output concerning the model, based on inference and optimization.

In addition, user equipment manufacturers, such as mobile device makers, server makers or entities associated with data storage and processing, may also realize various benefits and/or advantages. As explained above, the end-users data is handled in a privacy preserving manner, and the tuner framework provides optimization that may limit data, such as data inputs or parameters, so as to reduce the information that needs to be provided by the device. For example, in some cases, if user location based on GPS is determined to be a non-optimal input or parameter, the updated model may not request or collect such information from the end-users device. As a result, the information that is obtained, sensed, collected and potentially stored in the end user device may be protected from use by the model. Further, because of the automation of the data framework, deep framework and tuner framework, there is no need for entities at the platform, developer, analytics, vendor or other level to access potentially sensitive and private information of the user. Thus, the device associated with these entities need not be accessed by the users, and privacy protection can further be obtained.

In one example implementation, an entity associated with online retailing, such as an online retailer, a manufacturer, a distributor or the like, may use the example implementations in order to determine how to promote products and/or services. In such a situation, the example implementations, using the tools, techniques, systems and approaches described herein, may provide the online retailer with a recommendation on which advertisement is most likely to influence a user to purchase a product. Conversely, when a user accesses an online website, and is browsing, searching or conducting online shopping, the example implementations may provide recommendations to a user, based on what the user is most likely to need. Further example implementations may also be associated with services, such as in relation to financial prediction, and promoting various services, products or the like, and recommending what to buy, and went to buy it.

The foregoing example implementations may have various benefits and advantages. As shown herein, accuracy, as well as relative operating characteristic, may be substantially improved over related art approaches by using the example implementations.

Figure 32:
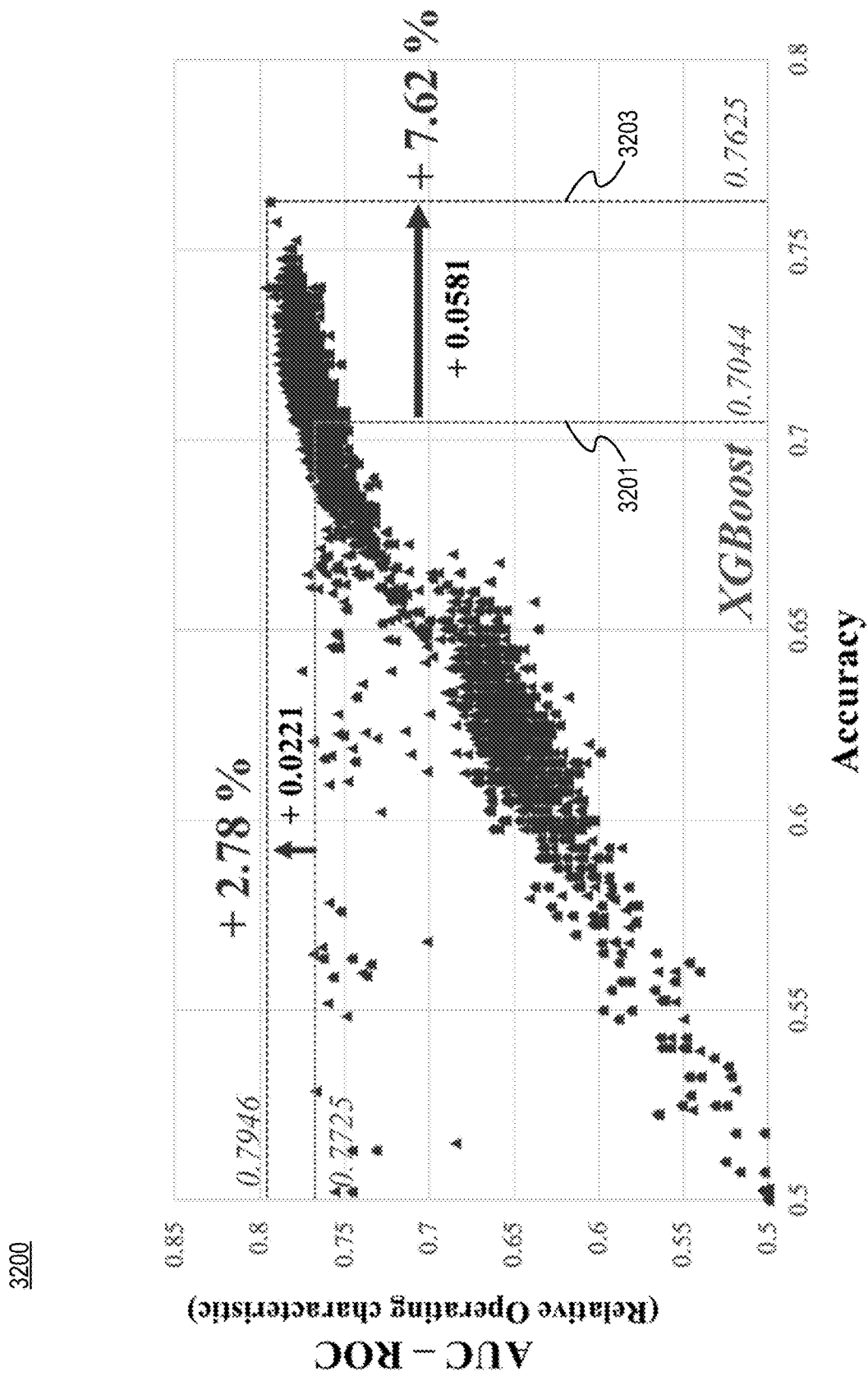
FIG. 32 illustrates a graphical presentation of a difference between the related art approaches and the example implementation.

As shown in FIG. 32, a graphical presentation 3200 is provided that shows the difference between the related art approaches and the example implementation, with respect to binary classification of a financial model. More specifically, a related art approach is shown by the broken line at 3201, and the approach according to the example implementation is shown at 3203. According to this example implementation, it can be seen that there is a 7.62% increase in accuracy, and a 2.78% increase in relative operating characteristic with the example implementation as compared with the related art, for the exact same data.

Further, there may be a dramatic reduction of computational cost by using the example implementations, such as to reduce unnecessary input data/parameters. The approaches in the example implementations may provide further benefits, in that processing speed may be substantially increased, and time to process data on the model may be substantially decreased by the optimizations. Thus, there is a benefit to the hardware system, by the model requiring less processing as compared with related art approaches, without sacrificing accuracy.

Another advantage or benefit of the present example implementations is that the framework provides for easy scaling. For example, but not by way of limitation, the tuner framework provides for optimization that may reduce the amount of data, inputs, parameters, etc. as explained above. As a result of this optimization, additional scaling may occur without an increase in the amount of computing, storing, communicating or other resources required, as compared with related art approaches.

Further, according to the example implementation, and as explained above the tuner framework provides for the optimization the artificial intelligence models. For example but not by way of limitation, the models may be optimized for different types of activity, and provided as template, depending on the type of behavior (e.g., commercial). For example but not by way of limitation, the difference between purchasing groceries online and purchasing an automobile procuring a loan for a new house online is quite significant; thus, different models may be provided as templates, based on prior optimizations. In contrast, related art approaches do not provide for such templates of models, because the model is created, but does not include the optimization of the example implementations as provided by the tuner framework described herein.

As a further benefit or advantage, a developer may experience ease-of-use. For example, but not by way of limitation, a user of the frameworks described in these example implementations need not create any code by their activity; at most, the developer needs to review feedback, select options and the like. As a result of this approach that provides for the automatic tuning, privacy is preserved as explained above.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer implemented method for generating and optimizing an artificial intelligence model, the method comprising:

receiving input data and labels, and performing data validation to generate a configuration file, and splitting the data to generate split data for training and evaluation, wherein the configuration file comprises a schema file, a feature file, a model file, and a cross feature file for generating the artificial intelligence model;

performing training and evaluation of the split data to determine an error level, and based on the error level, performing an action, wherein the action comprises at least one of modifying the configuration file and tuning the artificial intelligence model automatically;

generating the artificial intelligence model based on the training, the evaluation and the tuning; and serving the model for production, wherein the performing data validation comprises:

for the input data being integer type data:

determine a data density based on a ratio of unique count with respect to maximum value count of data, for the data density being greater than or equal to a first threshold:

characterizing the input data as contiguous;

determining if the maximum value count of data is greater than or equal to a second threshold value;

for the maximum value count of data being greater than or equal to the second threshold value, characterizing the input data as contiguous and large, and providing the input data with categorical column with identity and embedding column; and for the maximum value count of data being smaller than the second threshold value, characterizing the input data as contiguous and small, and providing the input data with categorical column with identity;

for the density being less than the first threshold:

characterizing the input data as sparse;

comparing the unique count against a third threshold;

for the unique count being greater than or equal to the third threshold, characterizing the input data as large and sparse, and providing the input data with categorical column with hash bucket and embedding column; and for the unique count being less than the third threshold, characterizing the input data as small and sparse, and providing the input data with categorical column with hash bucket, and generating a validation report, wherein the validation report provides information on data errors associated with the input data.

2. The computer implemented method of claim 1, wherein the tuning comprises:
   automatically optimizing one or more input features associated with the input data;
   automatically optimizing hyper-parameters associated with the generated artificial intelligence model; and
   automatically generating an updated model based on optimized one or more input features and the optimize hyper-parameters.

3. The computer implemented method of claim 2, wherein the one or more input features are optimize by a genetic algorithm to optimize combinations of the one or more input features, and generate a list of the optimize input features.

4. The computer implemented method of claim 2, wherein the automatically optimizing the hyper-parameters comprises application of at least one of a Bayesian and random algorithm to optimize based on the hyper-parameters.

5. The computer implemented method of claim 2, wherein the automatically optimizing the one or more input features is performed in a first iterative loop that is performed until a first prescribed number of iterations has been met, and the automatically optimizing the hyper-parameters and the automatically generating the updated model is performed in a second iterative loop until a second prescribed number of iterations has been met.

6. The computer implemented method of claim 5, wherein the first iterative loop and the second iterative loop are performed iteratively until a third prescribed number of iterations has been met.

7. The computer implemented method of claim 1, wherein the performing the training and the evaluation comprises execution of one or more feature functions based on a data type of the data, a density of the data, and an amount of the data.

8. A non-transitory computer readable medium configured to execute machine-readable instructions stored in a storage, for generating and optimizing an artificial intelligence model, the instructions comprising:
   receiving input data and labels, and performing data validation to generate a configuration file, and splitting the data to generate split data for training and evaluation, wherein the configuration file comprises a schema file, a feature file, a model file, and a cross feature file for generating the artificial intelligence model;
   performing training and evaluation of the split data to determine an error level, and based on the error level, performing an action, wherein the action comprises at least one of modifying the configuration file and tuning the artificial intelligence model automatically;
   generating the artificial intelligence model based on the training, the evaluation and the tuning; and
   serving the model for production,
   wherein the performing data validation comprises:
      for the input data being integer type data:
         determine a data density based on a ratio of unique count with respect to maximum value count of data,
         for the data density being greater than or equal to a first threshold:
            characterizing the input data as contiguous;
            determining if the maximum value count of data is greater than or equal to a second threshold value;
            for the maximum value count of data being greater than or equal to the second threshold value, characterizing the input data as contiguous and large, and providing the input data with categorical column with identity and embedding column; and
            for the maximum value count of data being smaller than the second threshold value, characterizing the input data as contiguous and small, and providing the input data with categorical column with identity;
         for the density being less than the first threshold:
            characterizing the input data as sparse;
            comparing the unique count against a third threshold;
            for the unique count being greater than or equal to the third threshold, characterizing the input data as large and sparse, and providing the input data with categorical column with hash bucket and embedding column; and
            for the unique count being less than the third threshold, characterizing the input data as small and sparse, and providing the input data with categorical column with hash bucket, and
      generating a validation report, wherein the validation report provides information on data errors associated with the input data.

9. The non-transitory computer readable medium of claim 8, wherein the tuning comprises:
   automatically optimizing one or more input features associated with the input data;
   automatically optimizing hyper-parameters associated with the generated artificial intelligence model; and
   automatically generating an updated model based on optimized one or more input features and the optimize hyper-parameters.

10. The non-transitory computer readable medium of claim 9, wherein the one or more input features are optimize by a genetic algorithm to optimize combinations of the one or more input features, and generate a list of the optimize input features.

11. The non-transitory computer readable medium of claim 9, wherein the automatically optimizing the hyper-parameters comprises application of at least one of a Bayesian and random algorithm to optimize based on the hyper-parameters.

12. The non-transitory computer readable medium of claim 9, wherein the automatically optimizing the one or more input features is performed in a first iterative loop that is performed until a first prescribed number of iterations has been met, and the automatically optimizing the hyper-parameters and the automatically generating the updated model is performed in a second iterative loop until a second prescribed number of iterations has been met.

13. The non-transitory computer readable medium of claim 12, wherein the first iterative loop and the second iterative loop are performed iteratively until a third prescribed number of iterations has been met.

14. The non-transitory computer readable medium of claim 8, wherein the performing the training and the evaluation comprises execution of one or more feature functions based on a data type of the data, a density of the data, and an amount of the data.

15. A system for generating and optimizing an artificial intelligence model, the system comprising:

a data framework configured to receive input data and labels, perform data validation to generate a configuration file, split the data to generate split data for training and evaluation;

a deep framework configured to perform training and evaluation of the split data to determine an error level, and based on the error level, to perform an action, generate the artificial intelligence model based on the training, the evaluation and the tuning, and serve the model for production; and a tuning framework configured to perform the action, wherein the action comprises at least one of modifying the configuration file and tuning the artificial intelligence model automatically, wherein the configuration file comprises a schema file, a feature file, a model file, and a cross feature file for generating the artificial intelligence model in the deep framework, and wherein the performing data validation comprises:
  for the input data being integer type data:
    determine a data density based on a ratio of unique count with respect to maximum value count of data,
    for the data density being greater than or equal to a first threshold:
    characterizing the input data as contiguous;
      determining if the maximum value count of data is greater than or equal to a second threshold value;
      for the maximum value count of data being greater than or equal to the second threshold value, characterizing the input data as contiguous and large, and providing the input data with categorical column with identity and embedding column; and
      for the maximum value count of data being smaller than the second threshold value, characterizing the input data as contiguous and small, and providing the input data with categorical column with identity;
    for the density being less than the first threshold:
    characterizing the input data as sparse;
      comparing the unique count against a third threshold;
      for the unique count being greater than or equal to the third threshold, characterizing the input data as large and sparse, and providing the input data with categorical column with hash bucket and embedding column; and
      for the unique count being less than the third threshold, characterizing the input data as small and sparse, and providing the input data with categorical column with hash bucket, and
  generating a validation report, wherein the validation report provides information on data errors associated with the input data.

16. The system of claim 15, wherein the tuning framework is configured to automatically optimize one or more input features associated with the input data, automatically optimize hyper-parameters associated with the generated artificial intelligence model, and automatically generate an updated model based on optimized one or more input features and the optimize hyper-parameters.

17. The system of claim 16, wherein the tuner framework automatically optimizes the one or more input features by application of a genetic algorithm to optimize combinations of the one or more input features, and generates a list of the optimize input features.

18. The system of claim 16, wherein the tuner framework automatically optimizes the the hyper-parameters by application of at least one of a Bayesian and random algorithm to optimize based on the hyper-parameters.

19. The system of claim 16, wherein the tuner framework performs the automatically optimizing the one or more input features in a first iterative loop until a first prescribed number of iterations has been met, and the tuner framework performs the automatically optimizing the hyper-parameters and the automatically generating the updated model in a second iterative loop until a second prescribed number of iterations has been met.

20. The system of claim 19, wherein the tuner framework performs the first iterative loop and the second iterative loop iteratively until a third prescribed number of iterations has been met.

* * * * *